US 7,855,021 B2

(12) United States Patent
Adzic et al.

(10) Patent No.: US 7,855,021 B2
(45) Date of Patent: Dec. 21, 2010

(54) ELECTROCATALYSTS HAVING PLATIUM MONOLAYERS ON PALLADIUM, PALLADIUM ALLOY, AND GOLD ALLOY CORE-SHELL NANOPARTICLES, AND USES THEREOF

(75) Inventors: Radoslav Adzic, Setauket, NY (US); Yibo Mo, Naperville, IL (US); Miomir Vukmirovic, Port Jefferson Station, NY (US); Junliang Zhang, Rochester, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 1325 days.

(21) Appl. No.: 11/156,038

(22) Filed: Jun. 20, 2005

(65) Prior Publication Data

US 2007/0031722 A1     Feb. 8, 2007

(51) Int. Cl.
*H01M 4/92*     (2006.01)
(52) U.S. Cl. ........................... 429/424; 429/482
(58) Field of Classification Search ............. 502/101, 502/182, 185, 527.15, 527.24, 339; 428/403, 428/570; 427/115; 429/40, 424, 482, 490, 429/506, 524, 532, 44
See application file for complete search history.

(56) References Cited

U.S. PATENT DOCUMENTS

| | | | |
|---|---|---|---|
| 3,340,097 A | 9/1967 | Hess et al. | |
| 3,511,683 A * | 5/1970 | Heilwell Israel J et al. | 427/216 |
| 3,645,860 A | 2/1972 | Fishman et al. | |
| 3,776,776 A | 12/1973 | Petrow | |
| 3,857,737 A | 12/1974 | Kemp et al. | |
| 3,977,901 A | 8/1976 | Buzzelli | |
| 4,031,292 A | 6/1977 | Hervert | |
| 4,388,383 A | 6/1983 | Heller | |
| 4,426,269 A | 1/1984 | Brown et al. | |
| 4,716,087 A | 12/1987 | Ito et al. | |
| 4,794,054 A | 12/1988 | Ito et al. | |
| 4,822,699 A | 4/1989 | Wan | |
| 5,024,905 A | 6/1991 | Itoh et al. | |
| 5,132,193 A | 7/1992 | Reddy et al. | |
| 5,202,299 A | 4/1993 | Symons et al. | |

(Continued)

FOREIGN PATENT DOCUMENTS

EP     0 617 439 A2     9/1994

(Continued)

OTHER PUBLICATIONS

J. Zhang, et al, J. Phys. Chem. B., 108: 10955-10964 (2004).*

(Continued)

*Primary Examiner*—Jennifer Michener
*Assistant Examiner*—Monique Wills
(74) *Attorney, Agent, or Firm*—Dorene M. Price

(57) ABSTRACT

The invention relates to platinum-coated particles useful as fuel cell electrocatalysts. The particles are composed of a noble metal or metal alloy core at least partially encapsulated by an atomically thin surface layer of platinum atoms. The invention particularly relates to such particles having a palladium, palladium alloy, gold alloy, or rhenium alloy core encapsulated by an atomic monolayer of platinum. In other embodiments, the invention relates to fuel cells containing these electrocatalysts and methods for generating electrical energy therefrom.

20 Claims, 7 Drawing Sheets

U.S. PATENT DOCUMENTS

| | | | |
|---|---|---|---|
| 5,208,207 | A | 5/1993 | Stonehart et al. |
| 5,225,391 | A | 7/1993 | Stonehart et al. |
| 5,470,673 | A | 11/1995 | Tseung et al. |
| 5,683,829 | A | 11/1997 | Sarangapani |
| 5,702,836 | A | 12/1997 | Ma et al. |
| 5,759,944 | A | 6/1998 | Buchanan et al. |
| 5,795,669 | A | 8/1998 | Wilkinson et al. |
| 5,804,325 | A | 9/1998 | Yepez |
| 5,922,487 | A | 7/1999 | Watanabe et al. |
| 6,007,934 | A | 12/1999 | Auer et al. |
| 6,183,894 | B1 | 2/2001 | Adzic et al. |
| 6,194,338 | B1 | 2/2001 | Andolfatto et al. |
| 6,200,457 | B1 | 3/2001 | Durand et al. |
| 6,232,264 | B1 | 5/2001 | Lukehart et al. |
| 6,284,402 | B1 | 9/2001 | Mallouk et al. |
| 6,326,098 | B1 | 12/2001 | Itoh et al. |
| 6,498,121 | B1 | 12/2002 | Gorer |
| 6,528,020 | B1 | 3/2003 | Dai et al. |
| 6,548,168 | B1 | 4/2003 | Mulvaney et al. |
| 6,585,947 | B1 | 7/2003 | Nayfeh et al. |
| 6,670,301 | B2 | 12/2003 | Adzic et al. |
| 6,749,892 | B2 | 6/2004 | Chang |
| 6,783,569 | B2 | 8/2004 | Cheon et al. |
| 7,205,255 | B2 * | 4/2007 | Yamamoto ............ 502/101 |
| 2001/0002275 | A1 | 5/2001 | Oldenburg et al. |
| 2003/0068432 | A1 | 4/2003 | Dai et al. |
| 2003/0135971 | A1 | 7/2003 | Liberman et al. |
| 2004/0038255 | A1 | 2/2004 | Mirkin et al. |
| 2004/0055419 | A1 | 3/2004 | Kurihara et al. |
| 2004/0131762 | A1 | 7/2004 | Vigie et al. |

FOREIGN PATENT DOCUMENTS

| | | |
|---|---|---|
| EP | 0 952 241 A1 | 10/1999 |
| EP | 0 85 0204 B1 | 12/2001 |
| JP | 54146878 A2 | 11/1979 |
| JP | 11064263 A2 | 3/1999 |
| JP | 21133388 A2 | 5/2001 |
| JP | 23086192 A2 | 3/2003 |
| WO | WO 91/06036 | 5/1991 |

OTHER PUBLICATIONS

J. Zhang, et al, *J. Phys. Chem. B.*, 108: 10955-10964 (2004).
Toda, T., et al, *J Electroanal. Chem.*, 460: 258-262 (1999).
Paulus, U., et al, *Electrochim. Acta.*, 47: 3787-3798 (2002).
Brankovic, S. R., et al, *Surf Sci.*, 474: L173-L179 (2001).
Brankovic, S. R., et al, *Electrochem. Solid State Lett.*. 4: A217-A220 (2001).
Stamenkovic, V., et al, *J Phys. Chem. B*, 106: 11970-11979 (2002).
Stamenkovic, V., et al, *J. Electroanal. Chem.*, 554-555: 191-199 (2003).
Peuckert, M., et al, *J. Electrochem. Soc*, 133: 944-947 (1986).
Rodriguez, J. A., et al, *Surf Sci. Rep.*, 24: 223-287 (1996).
Schmidt, T. J., et al, *Electrochim. Acta.*, 47: 3765-3776 (2002).
Baldauf, M., et al, *J Phys. Chem.*, 100: 11375-11381 (1996).
Naohara, H., et al, *Electrochim. Acta.*, 45: 3305-3309 (2000).
Meitzner, G., et al, *J. Phys. Chem.*, 96: 4960-4964 (1992).
Mukerjee, S., et al, *J. Electrochem. Soc.*, 142: 1409-1422 (1995).
Toda, T., et al, *J. Electrochem. Soc.*, 145: 4185-4188 (1998).
Sasaki, K., et al, *Electrochim. Acta.*, 48: 3841-3849 (2003).
Buatier de Mongeot, F., et al, *Surf Sci.*, 411: 249-262 (1998).
Mrozek, M. F., et al, *Anal. Chem.*, 73: 5953-5960 (2001).
Chrzanowski, W., et al, *Langmuir*, 13: 5974-5978 (1997).
Chrzanowski, W., et al, *Catal. Lett.*, 50: 69-75 (1998).
Attard, G. A., et al, *J. Electroanal. Chem.*, 300: 467-485 (1991).
Llorka, M. J., et al, *J. Electroanal. Chem.*, 351: 299-319 (1993).
Zoval, J. V., et al, *J Phys. Chem. B*, 102: 1166-1175 (1998).
Parsons, R., et al, *J. Electroanal. Chem.*, 257: 9-45 (1988).
Ma, et al, *Mater. Res. Soc. Proc.*, 332: 327-333 (1994).
Kadirgan, F., et al, *J. Electroanal. Chem.*, 125: 89-103 (1981).
Enyo, M., et al, *J. Appl. Electrochem.*, 15: 907-911 (1985).
Koljadko, J., et al, *J Electroanal. Chem.*, 137:117-125 (1982).
Solla-Gullon, J., et al, *Electrochem. Commun.*, 4 (9): 716-721 (2002).
Brankovic, S. R., et al, *J Electroanal. Chem.*, 503: 99-104 (2001).
Holmberg, K., *J Colloid Interface Sci.*, 274: 355-364 (2004).
Penner, R.M., *Acc. Chem. Res.*, 33: 78-86 (2000).
Wang, J. X., et al., *J. Electrochemical Society*, 150 (8): A1108-A1117 (2003).
Wang, J. X., et al., *J. Phys. Chem B*, 150: 4147-4133 (2004).
Uribe, F. A., et al., *Electrochimica Acta*, 47: 3799-3806 (2002).
Adzic, et al., US DOE Hydrogen, Fuel Cells & Infrastructure Technologies Program Review Meeting, Philadelphia, PA, May 24-27, 2004.
Adzic, et al., US DOE Hydrogen, Fuel Cells & Infrastructure Technologies Program Review Meeting, Washington, DC, May 23-26, 2004.

* cited by examiner

US 7,855,021 B2

ELECTROCATALYSTS HAVING PLATIUM MONOLAYERS ON PALLADIUM, PALLADIUM ALLOY, AND GOLD ALLOY CORE-SHELL NANOPARTICLES, AND USES THEREOF

This invention was made with Government support under contract number DE-AC02-98CH10886, awarded by the U.S. Department of Energy. The Government has certain rights in the invention.

This application is a continuation-in-part of, and asserts priority to, U.S. application Ser. No. 11/019,759 filed Dec. 22, 2004 now U.S. Pat. No. 7,691,780. The specification of U.S. application Ser. No. 11/019,759 is hereby incorporated by reference in its entirety.

The present invention relates to platinum-coated particles useful as fuel cell electrocatalysts. The invention particularly relates to such particles having a palladium, palladium alloy, gold alloy, or rhenium alloy core encapsulated by a thin coating of platinum.

BACKGROUND OF THE INVENTION

A "fuel cell" is a device which converts chemical energy into electrical energy. In a typical fuel cell, a gaseous fuel, such as hydrogen, is fed to an anode (the negative electrode), while an oxidant, such as oxygen, is fed to a cathode (the positive electrode). Oxidation of the fuel at the anode causes a release of electrons from the fuel into an electrically conducting external circuit which connects the anode and cathode. In turn, the oxidant is reduced at the cathode using the electrons provided by the oxidized fuel.

The electrical circuit is completed by the flow of ions through an electrolyte that allows chemical interaction between the electrodes. The electrolyte is typically in the form of a proton-conducting polymer membrane. The proton-conducting membrane separates the anode and cathode compartments while allowing the flow of protons between them. A well-known example of such a proton-conducting membrane is NAFION®.

A fuel cell, although having components and characteristics similar to those of a typical battery, differs in several respects. A battery is an energy storage device whose available energy is determined by the amount of chemical reactant stored within the battery itself. The battery will cease to produce electrical energy when the stored chemical reactants are consumed. In contrast, the fuel cell is an energy conversion device that theoretically has the capability of producing electrical energy for as long as the fuel and oxidant are supplied to the electrodes.

In a hydrogen/oxygen fuel cell, hydrogen is supplied to the anode and oxygen is supplied to the cathode. Hydrogen molecules are oxidized to form protons while releasing electrons into the external circuit. Oxygen molecules are reduced at the cathode to form reduced oxygen species. Protons travel across the proton-conducting membrane to the cathode compartment to react with reduced oxygen species, thereby forming water. The reactions in a typical hydrogen/oxygen fuel cell are as follows:

Anode: $2H_2 \rightarrow 4H^+ + 4e^-$ (1) 

Cathode: $O_2 + 4H^+ + 4e^- \rightarrow 2H_2O$ (2) 

Net Reaction: $2H_2 + O_2 \rightarrow 2H_2O$ (3) 

In many fuel cell systems, a hydrogen fuel is produced by converting a hydrocarbon-based fuel such as methane, or an oxygenated hydrocarbon fuel such as methanol, to hydrogen in a process known as "reforming". The reforming process typically involves the reaction of such fuels with water along with the application of heat. By this reaction, hydrogen is produced. The byproducts of carbon dioxide and carbon monoxide typically accompany the production of hydrogen in the reformation process.

Other fuel cells, known as "direct" or "non-reformed" fuel cells, directly oxidize fuels high in hydrogen content. For example, it has been known for some time that lower primary alcohols, particularly methanol, can be oxidized directly. Due to the advantage of bypassing the reformation step, a substantial effort has gone into the development of so-called "direct methanol oxidation" fuel cells.

In order for the oxidation and reduction reactions in a fuel cell to occur at useful rates and at desired potentials, electrocatalysts are required. Electrocatalysts are catalysts that promote the rates of electrochemical reactions, and thus, allow fuel cells to operate at lower potentials. Accordingly, in the absence of an electrocatalyst, a typical electrode reaction would occur, if at all, only at very high potentials. Due to the high catalytic nature of platinum, platinum and platinum alloy materials are preferred as electrocatalysts in the anodes and cathodes of fuel cells.

However, a significant obstacle in commercializing fuel cells is the limitation of current platinum electrocatalysts. For example, one major problem is found in the slow kinetics of oxygen reduction in current platinum oxygen-reducing cathodes. In addition, a large loss in potential of 0.3-0.4 volts is typically observed during operation of fuel cells containing these platinum electrocatalysts. This loss in potential is the source of a major decline in the fuel cell's efficiency.

Another problem in existing electrocatalyst technology is the high platinum loading in fuel cell cathodes. Since platinum is a high-cost precious metal, high platinum loading translates to high costs of manufacture.

Accordingly, there have been efforts to reduce the amount of platinum in electrocatalysts. For example, platinum nanoparticles have been studied as electrocatalysts. See, for example, U.S. Pat. No. 6,007,934 to Auer et al.; and U.S. Pat. No. 4,031,292 to Hervert.

Platinum-alloy compositions have also been studied. In particular, platinum-palladium alloy nanoparticles have been studied. See, for example, U.S. Pat. No. 6,232,264; Solla-Gullon, J., et al, "Electrochemical And Electrocatalytic Behaviour Of Platinum-Palladium Nanoparticle Alloys", *Electrochem. Commun.*, 4, 9: 716 (2002); and Holmberg, K., "Surfactant-Templated Nanomaterials Synthesis", *J. Colloid Interface Sci.*, 274: 355 (2004).

Other platinum-alloy compositions have been studied. For example, U.S. Pat. No. 5,759,944 to Buchanan et al. discloses platinum-nickel and platinum-nickel-gold electrocatalyst compositions.

U.S. Pat. No. 6,670,301 B2 to Adzic et al. relates to an atomic monolayer of platinum on ruthenium nanoparticles. The platinum-coated ruthenium nanoparticles are disclosed as carbon monoxide-tolerant anode electrocatalysts useful in fuel cells. See also Brankovic, S. R., et al., "Pt Submonolayers On Ru Nanoparticles—A Novel Low Pt Loading, High CO Tolerance. Fuel Cell Electrocatalyst," *Electrochem. Solid State Lett.*, 4, p. A217 (2001); and Brankovic, S. R., et al, "Spontaneous Deposition Of Pt On The Ru(0001) Surface", *J. Electroanal. Chem.*, 503: 99 (2001), which also disclose platinum monolayers on ruthenium nanoparticles.

None of the art considered above disclose platinum-coated particles, particularly nanoparticles, useful as oxygen-reducing electrocatalysts and having low platinum loading. Yet, there is a need for electrocatalysts having these advantages. The present invention relates to such electrocatalysts.

SUMMARY OF THE INVENTION

In one aspect, the present invention relates to platinum- and platinum alloy-coated palladium or palladium alloy particles. The platinum and platinum alloy coatings are atomically thin layers, i.e., atomic submonolayers, monolayers, bilayers, trilayers, or combinations thereof.

In one embodiment, an atomic submonolayer of platinum contains only platinum atoms in the absence of other co-deposited metal atoms.

In another embodiment, an atomic submonolayer of platinum atoms includes one or more co-deposited atomic submonolayers of another metal to form a platinum-metal alloy monolayer. The co-deposited metal(s) in the platinum-alloy monolayer can be, for example, a main group, transition, lanthanide, or actinide metal. The co-deposited metal is preferably a transition metal.

More preferably, the co-deposited metal is iridium (Ir), ruthenium (Ru), osmium (Os), rhenium (Re), or any combination thereof. Even more preferably, the platinum-metal alloy monolayer is according to the molar composition $M_{0.2}Pt_{0.8}$, where M is Ir, Ru, Os, or Re. Most preferably, the platinum-metal alloy monolayer is according to the molar composition $Re_{0.2}Pt_{0.8}$ or $Os_{0.2}Pt_{0.8}$.

The platinum-coated palladium or palladium alloy nanoparticles preferably have a minimum size of about 3 nanometers and a maximum size of about 10 nanometers. The maximum size of the nanoparticles is preferably no more than about 12 nanometers. The platinum-coated palladium or palladium alloy nanoparticles most preferably have a size of about 5 nanometers.

When applied as fuel cell electrocatalysts, the particle composites are preferably platinum monolayer- or submonolayer-coated palladium or palladium alloy particles. The particles are even more preferably nanoparticles.

One embodiment relates to platinum-coated palladium particles. The platinum-coated palladium particles contain a core composed of zerovalent palladium.

In one embodiment, the palladium core is coated with a shell of zerovalent platinum atoms. In another embodiment, the palladium core is coated with a shell of platinum atoms wherein at least some portion of the platinum atoms are in a zerovalent oxidation state and the remainder of the platinum atoms are charged.

Another embodiment relates to platinum-coated noble metal cores wherein the noble metal is other than palladium. Some examples of such noble metal cores include those composed of rhenium, iridium, or rhodium. These noble metal cores are at least partially encapsulated by an atomically thin layer of platinum atoms. At least a portion of the platinum atoms are in a zerovalent oxidation state.

Another embodiment relates to platinum-coated metal alloy particles. These particles contain a core composed of a metal alloy which is at least partially encapsulated by an atomically thin layer of platinum atoms, at least a portion of which are in a zerovalent oxidation state.

The metal alloy core is preferably composed of a combination of two or more metals selected from second row and third row transition metals. For example, the metal alloy core can be a combination of two or more second row transition metals, a combination of two or more third row transition metals, or a combination of one or more second row transition metals and one or more third row transition metals.

The second row and third row transition metals are more preferably metals having noble character. Some examples of second row and third row transition metals having noble character include ruthenium, palladium, silver, rhenium, osmium, iridium, platinum, and gold.

For example, the metal alloy core can be a homogeneous or heterogeneous alloy of palladium-ruthenium, palladium-rhenium, palladium-iridium, palladium-rhodium, palladium-gold, rhodium-gold, iridium-gold, ruthenium-gold, osmium-gold, rhenium-gold, iridium-rhodium, ruthenium-rhodium, osmium-rhodium, rhenium-rhodium, ruthenium-iridium, osmium-iridium, rhenium-iridium, osmium-ruthenium, rhenium-ruthenium, and rhenium-osmium. Particularly preferred are metal alloy cores having rhenium-gold and rhenium-iridium compositions.

In another embodiment, the metal alloy core is composed of a combination of one or more second row and/or third row transition metals in combination with one or more first row transition metals. Particularly preferred are metal alloy cores composed of one or more noble metals in combination with one or more first row transition metals.

In one embodiment, the metal alloy core is a homogeneous or heterogeneous alloy of one or a combination of zerovalent or charged 4d (second row) and/or 5d (third row) transition metals in combination with one or a combination of 3d (first row) transition metals. Preferably, the one or combination of 4d and/or 5d transition metals are selected from zerovalent or charged atoms of gold, rhodium, iridium, ruthenium, osmium, and rhenium. More preferably, the foregoing 4d and/or 5d transition metals are combined with one or a combination of zerovalent 3d transition metals selected from nickel, cobalt, and iron.

For example, particularly preferred is the class of platinum-coated palladium alloy particles. The platinum-coated palladium alloy particles contain a core composed of zerovalent palladium alloy. The palladium alloy core is coated with a shell of zerovalent or partially charged platinum or platinum-alloy.

Preferably, the alloying component in the palladium alloy is a metal or combination of metals other than platinum. More preferably, the alloying metal is one or more transition metals. Even more preferably, the alloying metal is one or more 3d transition metals, i.e., the row of transition metals starting with scandium (Sc). Even more preferably, the alloying metals are selected from nickel (Ni), cobalt (Co), iron (Fe), or any combination thereof. Gold (Au), or its combination with other metals, particularly, Ni, Co, and Fe, are other preferred alloying metals.

Another particularly preferred class of platinum-coated metal alloy particles is the class of platinum-coated gold alloy cores. Preferably, the gold alloy core is composed of gold in combination with one or a combination of first row transition metals. More preferably, the one or more first row transition metals are selected from nickel, cobalt, and iron. Even more preferably, the gold alloy core is an alloy of gold and nickel.

In one embodiment, the metal alloy core is homogeneous. A homogeneous metal alloy core contains a metal and one or more alloying components distributed uniformly-throughout the core.

In another embodiment, the metal alloy core is heterogeneous. In a preferred embodiment, a heterogeneous core is composed of an inner subcore and an outer shell. The inner subcore is preferably composed of one or a combination of metals of less-noble or non-noble character as compared to the one or combination of metals of the outer shell.

For example, a palladium alloy core can be heterogeneous. An example of a heterogeneous palladium-metal alloy core is one having a non-palladium inner subcore encapsulated by an outer shell of palladium. The outer shell of palladium is bonded to the atomically thin coating of platinum.

The inner subcore is preferably composed of one or a combination of first row transition metals. Preferably, such an inner subcore is at least partially encapsulated by an outer shell composed of one or a combination of metals selected from second row and/or third row transition metals. The outer shell is more preferably composed of one or a combination of metals having noble character.

The outer shell of second row and/or third row transition metals is more preferably atomically thin. For example, the outer shell is preferably an atomic submonolayer, monolayer, bilayer, trilayer, or a combination thereof, of the second row and/or third row transition metals.

In a particularly preferred embodiment, a subcore composed of one or a combination of zerovalent first row transition metals selected from nickel, cobalt, and iron, is encapsulated by an outer shell composed of one or a combination of zerovalent or charged second row and/or third row transition metal atoms selected from gold, palladium, rhodium, iridium, ruthenium, osmium, and rhenium.

Another particularly preferred heterogeneous core includes a subcore of zerovalent nickel, cobalt, iron, or a combination thereof, at least partially encapsulated by an outer shell of zerovalent or charged gold atoms. Even more preferably, the outer shell of gold is an atomically thin layer of gold. Even more preferably, the atomically thin layer of gold is an atomic monolayer of gold. The atomically thin layer of platinum bonded to the atomically thin layer of gold is preferably an atomic monolayer of platinum.

Another particularly preferred heterogeneous core contains a subcore of one or a combination of zerovalent first row transition metals at least partially encapsulated by an outer shell of one or a combination of second row and/or third row transition metal atoms selected from rhodium, iridium, ruthenium, osmium, and rhenium. More preferably, the outer shell is an atomically thin layer of one or more of the foregoing metals.

In one embodiment, the outer shell is composed of zerovalent rhodium, iridium, ruthenium, osmium, or rhenium atoms. In another embodiment, some portion of the outer shell is composed of charged rhodium, iridium, ruthenium, osmium, or rhenium atoms. In a particular embodiment, the outer shell is composed of an oxide of rhodium, iridium, ruthenium, osmium, or rhenium.

When appropriate, the particle and nanoparticle composites as thus far described can have metal-bonding ligands or surfactants bound to, or associated with, the surface layer of zerovalent or partially charged platinum.

The particle and nanoparticle composites can also be in the form of a suspension or dispersion in a liquid phase. The liquid phase can be any suitable liquid phase such as an organic solvent or an alcohol. Preferably, the liquid phase is aqueous-based. Some examples of suitable aqueous-based liquid phases include water and water-alcohol mixtures.

In another embodiment, the invention relates to a catalyst. The catalyst includes the platinum-coated particles as thus far described.

In one embodiment, the platinum-coated particles in the catalyst are bound to a support. The support can be any suitable support. For example, the support can be carbon, alumina, silica, silica-alumina, titania, zirconia, calcium carbonate, barium sulphate, a zeolite, interstitial clay, and the like. In another embodiment, the platinum-coated particles in the catalyst are not bound to a support.

In another embodiment, the particle composites of the invention are applied as electrocatalysts, and particularly, oxygen reduction electrocatalysts. The oxygen reduction electrocatalysts are preferably bound to an electrically conductive support. Some preferred. electrically conductive supports include carbon black, graphitized carbon, graphite, or activated carbon.

In another embodiment, the invention relates to a method for reducing oxygen gas. In one embodiment, the method uses the particle composites described above to reduce oxygen gas. The particle composites can be in the form of a solid, or alternatively, dispersed or suspended in a liquid phase when contacting oxygen gas. In another embodiment, the particle composites are bound to a support when reducing oxygen gas.

In another embodiment, the invention relates to a fuel cell. In the fuel cell, the oxygen-reducing cathode contains the platinum-coated particle composites bound to an electrically conductive support. The fuel cell additionally contains the other elements typical of a fuel cell, e.g., an anode, an ion-conducting electrolyte, and an electrical contact between the anode and cathode. The ion-conducting electrolyte is more preferably a proton-conducting electrolyte, and even more preferably a solid proton-conducting electrolyte, such as a proton-conducting membrane.

In a method for generating electrical energy, the oxygen-reducing cathode of the fuel cell is contacted with an oxidant, such as oxygen, while the anode of the fuel cell is contacted with a fuel source.

Some contemplated fuel sources include, for example, hydrogen gas and alcohols. The fuels can be unreformed or reformed.

Some examples of suitable alcohols include methanol and ethanol. Examples of other fuels include methane, gasoline, formic acid, dimethyl ether, and ethylene glycol.

As a result of the present invention, improved oxygen-reducing catalytic activities and further reductions in platinum loading can be made possible.

DETAILED DESCRIPTION OF THE INVENTION

Figure 1:
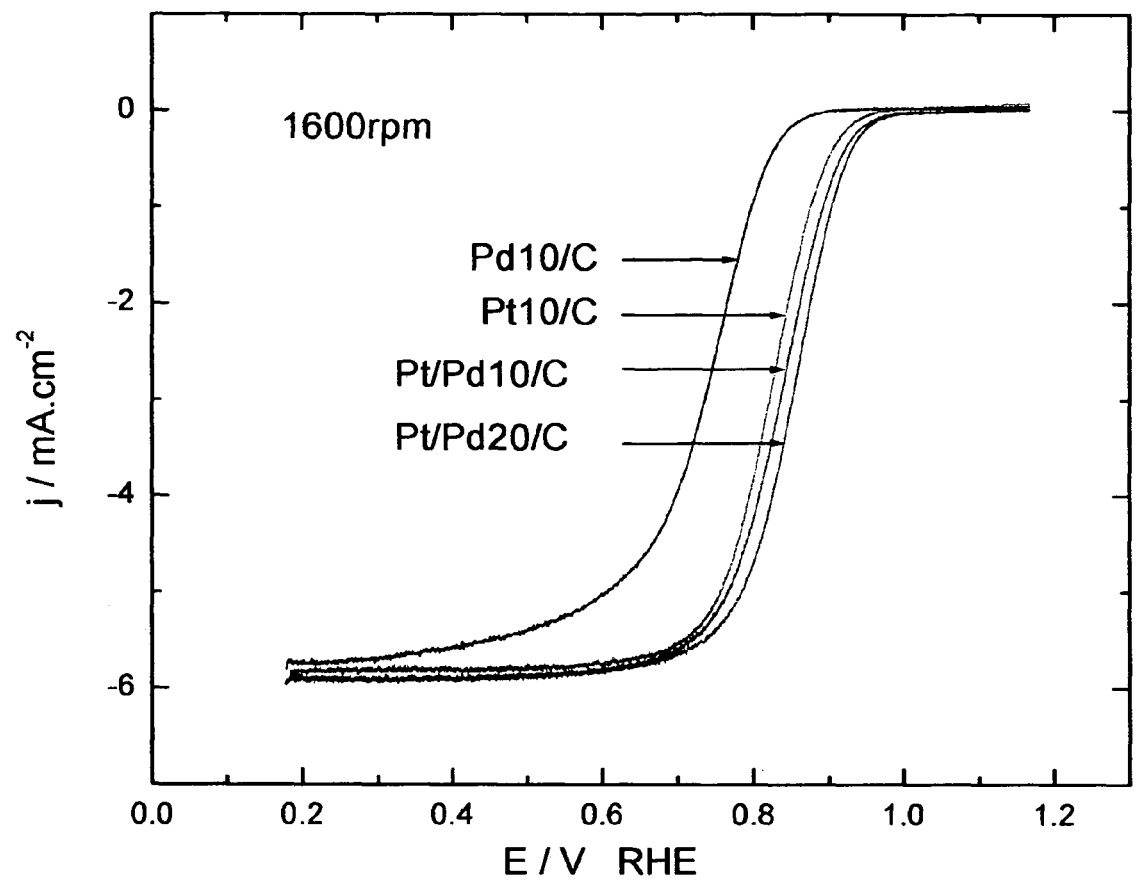
FIG. 1. Comparison of polarization curves for oxygen reduction on palladium nanoparticles, 10 nmol loading (left curve); commercial platinum nanoparticles, 10 nmol loading (second to left curve); and platinum-coated palladium nanoparticles of the present invention, 10 and 20 nmol Pd loadings, (two right curves).

The invention relates, generally, to particle composites having a metal or metal alloy core coated with, or at least partially encapsulated by, an atomically thin surface layer of zerovalent or charged platinum atoms.

Preferably, at least a portion of the platinum atoms in the atomically thin layer of platinum are in a zerovalent oxidation state. The atomically thin layer of platinum atoms can be composed of platinum atoms which are all zerovalent, or alternatively, wherein a portion of the platinum atoms are charged and some portion zerovalent.

The atomically thin surface layer of platinum can have a thickness of up to a few atom layers of zerovalent or partially charged platinum. Preferably, the atomically thin surface layer is a layer of zerovalent platinum atoms of sub-monoatomic, monoatomic, diatomic, or triatomic thickness, or any combination thereof.

A layer of monoatomic thickness of platinum atoms, i.e., an atomic monolayer, is a single layer of close-packed platinum atoms on the palladium or palladium alloy substrate particle surface. An atomic monolayer has a surface packing parameter of 1.

A layer of sub-monoatomic coverage, i.e., an atomic sub-monolayer, is a layer of platinum atoms which is less dense than an atomic monolayer (i.e., not close-packed). Accordingly, an atomic submonolayer has a surface packing parameter of less than 1. For example, a surface packing parameter of 0.5 indicates half the density of platinum atoms as compared to a platinum atomic monolayer.

A layer of diatomic thickness refers to a bilayer (two-atom thick) of zerovalent or charged platinum atoms. A layer of triatomic thickness refers to a trilayer (three-atom thick) of zerovalent or charged platinum atoms.

In one embodiment, an atomic submonolayer of platinum contains only platinum atoms in the absence of other co-deposited metal atoms.

In another embodiment, an atomic submonolayer of platinum atoms includes one or more co-deposited atomic sub-monolayers of another metal to form a platinum alloy monolayer. The co-deposited metal(s) in the platinum alloy monolayer can be selected from, for example, the main group, transition, lanthanide, and actinide classes of metals.

The co-deposited metal(s) in such an atomically thin layer of platinum atoms provide such advantages as, for example, further reduction in platinum loading as compared to a purge platinum layer, reduction in catalytic poisoning, and/or enhancement of catalytic activity. For example, some metals, particularly some of the transition metals, have the ability to adsorb hydroxyl groups (OH). Hydroxyl groups are known to inhibit the oxygen-reducing catalytic activity of platinum. Therefore, particularly when applied as fuel cell catalysts, the co-depositing metal is more preferably a metal known to adsorb OH.

Preferably, the hydroxyl-adsorbing metal is a second row (4d) or third row (5d) transition metal which forms an oxide composition at suitable oxidizing potentials. Suitable oxidizing potentials are typically encountered during operation of a fuel cell at the cathode. Some examples of suitable hydroxyl-absorbing transition metals include iridium (Ir), ruthenium (Ru), osmium (Os), rhenium (Re), and combinations thereof. Oxide compositions of these metals help to suppress the adsorption of hydroxyl groups onto platinum.

The molar composition of such a platinum alloy monolayer is not particularly limited. For example, such a platinum alloy monolayer can be a binary alloy according to the molar composition formula $M_xPt_{1-x}$ (1), wherein M is any of the metals described above.

In formula (1), the value of x is not particularly limited. Preferably, x has a minimum value of about 0.01, more preferably 0.05, and even more preferably 0.1. Preferably, x has a maximum value of about 0.99, more preferably a value of about 0.9, more preferably a value of about 0.6, and even more preferably, a maximum value of about 0.5. In a preferred embodiment, x has a value of about 0.2.

Some more specific platinum binary alloy monolayers of formula (1) are represented by the molar composition formulas $Ir_xPt_{1-x}$, $Ru_xPt_{1-x}$, $Os_xPt_{1-x}$, or $Re_xPt_{1-x}$. Some specific examples of platinum binary alloy monolayers include $Ir_{0.01}Pt_{0.99}$, $Ir_{0.1}Pt_{0.9}$, $Ir_{0.2}Pt_{0.8}$, $Ir_{0.3}Pt_{0.7}$, $Ir_{0.5}Pt_{0.5}$, $Ir_{0.7}Pt_{0.3}$, $Ir_{0.8}Pt_{0.2}$, $Ir_{0.9}Pt_{0.1}$, $Ir_{0.95}Pt_{0.05}$, $Ru_{0.01}Pt_{0.99}$, $Ru_{0.1}Pt_{0.9}$, $Ru_{0.2}Pt_{0.8}$, $Ru_{0.3}Pt_{0.7}$, $Ru_{0.5}Pt_{0.5}$, $Ru_{0.7}Pt_{0.3}$, $Ru_{0.8}Pt_{0.2}$, $Ru_{0.9}Pt_{0.1}$, $Ru_{0.95}Pt_{0.05}$, $Os_{0.2}Pt_{0.8}$, $Os_{0.5}Pt_{0.5}$, $Os_{0.7}Pt_{0.3}$, $Os_{0.8}Pt_{0.2}$, $Os_{0.9}Pt_{0.1}$, $Re_{0.2}Pt_{0.8}$, $Re_{0.5}Pt_{0.5}$, $Re_{0.7}Pt_{0.3}$, $Re_{0.8}Pt_{0.2}$, and $Re_{0.9}Pt_{0.1}$.

The platinum alloy monolayer can additionally be a ternary alloy. For example, the platinum alloy monolayer can be a ternary alloy according to the molar composition formula $M_xN_yPt_{1-x-y}$ (2). In formula (2), M and N are independently any of the suitable metals described above. The values of x and y are not particularly limited. By the rules of chemistry, the sum of x and y in formula (2) must be less than 1. For example, x and y can independently have a value of about 0.01 to a value of about 0.99, as long as the sum of x and y is less than 1.0. More preferably, the sum of x and y has a minimum value of about 0.1 and a maximum value of about 0.9.

Some more specific platinum ternary alloy monolayers of formula (2) are represented by the molar composition formulas $Ir_xRu_yPt_{1-x-y}$, $Ir_xOs_yPt_{1-x-y}$, $Ir_xRe_yPt_{1-x-y}$, $Os_xRu_yPt_{1-x-y}$, $Re_xRu_yPt_{1-x-y}$, and $Re_xOs_yPt_{1-x-y}$. Some specific examples of ternary platinum-metal alloy monolayers include $Ir_{0.0}Ru_{0.1}Pt_{0.98}$, $Ir_{0.1}Ru_{0.1}Pt_{0.8}$, $Ir_{0.2}Ru_{0.1}Pt_{0.7}$, $Ir_{0.1}Ru_{0.2}Pt_{0.7}$, $Ir_{0.3}Ru_{0.1}Pt_{0.6}$, $Ir_{0.5}Ru_{0.1}Pt_{0.4}$, $Ir_{0.01}Os_{0.01}Pt_{0.98}$, $Ir_{0.1}Os_{0.1}Pt_{0.8}$, $Ir_{0.2}Os_{0.1}Pt_{0.7}$, $Ir_{0.1}Os_{0.2}Pt_{0.7}$, $Ir_{0.01},Re_{0.01}Pt_{0.98}$, $Ir_{0.1}Re_{0.1}Pt_{0.8}$, $Ir_{0.2}Re_{0.1}Pt_{0.7}$, and $Ir_{0.1}Re_{0.2}Pt_{0.7}$.

The platinum alloy monolayer can additionally be a quaternary alloy. For example, the platinum alloy monolayer can be a quaternary alloy according to the molar composition formula $M_xN_yT_zPt_{1-x-y-z}$ (3). In formula (3), M, N, and T are independently any of the suitable metals described above. The values of x, y, and z are not particularly limited. By the rules of chemistry, the sum of x, y, and z in formula (3) must be less than 1. For example, x, y, and z can independently have a value of about 0.01 to a value of about 0.99 as long as the sum of x, y, and z is less than 1.0. More preferably, the sum of x, y, and z has a minimum value of about 0.1 and a maximum value of about 0.9.

Some more specific platinum quaternary alloy monolayers of formula (3) are represented by the formulas $Ir_xRu_yRe_zPt_{1-x-y-z}$ or $Ir_xRu_yOs_zPt_{1-x-y-z}$. Some specific examples of quaternary platinum alloy monolayers include $Ir_{0.04}Ru_{0.01}Re_{0.01}Pt_{0.97}$, $Ir_{0.1}Ru_{0.1}Re_{0.1}Pt_{0.7}$, $Ir_{0.2}Ru_{0.1}Os_{0.1}Pt_{0.6}$, and $Ir_{0.1}Ru_{0.2}Os_{0.1}Pt_{0.6}$.

The metals alloying with platinum tend to selectively form oxides at suitable oxidation potentials. Accordingly, all of the examples given above for platinum alloy monolayers include the corresponding oxidized compositions, i.e., wherein platinum is combined (e.g., mixed or interlaced) with the oxide of the alloying metal. The oxide of the alloying metal can be designated as, for example, $IrO_v$, $RuO_v$, $OsO_v$, or $ReO_v$, wherein the subscript v is a suitable generic or specific number of stoichiometric or non-stoichiometric proportion.

In a preferred embodiment, the atomically thin layer of platinum atoms covers or encapsulates the entire surface of the zerovalent metal or metal alloy core. In another embodiment, the atomically thin layer of platinum atoms covers a portion of, i.e., partially encapsulates, the zerovalent metal or metal alloy core. For example, the atomically thin layer of platinum surface atoms can be characterized as interconnected platinum islands with some regions of monoatomic, diatomic, or triatomic depth.

In one embodiment, the invention relates to platinum-coated palladium particles, i.e., particle composites having a zerovalent palladium core coated with, or at least partially encapsulated by, an atomically thin surface layer of platinum atoms. The platinum-coated palladium particles contain a core composed of palladium atoms in the zerovalent oxidation state.

Another embodiment relates to platinum-coated noble metal cores wherein the noble metal is other than palladium. Some examples of such noble metal cores include those composed of rhenium, iridium, rhodium, silver, and osmium. These noble metal cores are at least partially encapsulated by an atomically thin shell of zerovalent or charged platinum atoms.

Yet another embodiment relates to platinum-coated particle composites having a metal alloy core. The alloy in the metal alloy core can be homogeneous or heterogeneous, or a combination thereof. The metal alloy core can also be a binary, ternary, quaternary, or higher alloy.

The metal alloy core is preferably composed of a combination of two or more metals selected from second row (4d) and third row (5d) transition metals. For example, the metal alloy core can be a combination of two or more second row transition metals, or a combination of two or more third row transition metals, or a combination of one or more second row transition metals and one or more third row transition metals.

The second row and third row transition metals in the metal alloy core are more preferably metals having noble character. Some examples of second row and third row transition metals having noble character include ruthenium, palladium, silver, rhenium, osmium, iridium, platinum, and gold.

particular relevance are particles having a palladium alloy core, i.e., the class of platinum-coated palladium alloy particles. The palladium alloy core is composed of zerovalent palladium atoms and an alloying component.

The alloying component in the palladium alloy core can be any chemical or chemicals capable of combining with palladium that do not include platinum or palladium. For example, the alloying component can be carbon, silicon, silicon oxide, a metal, a polymer or polymer end-product, a dendrimer, a natural-based product such as cellulose, and so on.

Preferably, the alloying component in the palladium alloy core is a metal or combination of metals not including palladium. For example, the metal in the palladium alloy can be an alkali, alkaline earth, main group, transition, lanthanide, or actinide metal.

More preferably, the alloying metal or metals in the palladium alloy core are transition metals. Even more preferably, the alloying component is one or more 3d transition metals, particularly nickel (Ni), cobalt (Co), and/or iron (Fe). Gold (Au), or its combination with other metals, particularly, Ni, Co, and Fe, are other preferred alloying components.

The palladium alloy core in the platinum-coated palladium alloy particles can be in a homogeneous form. A homogeneous palladium alloy composition is a form in which the palladium and the alloying component(s) are distributed uniformly on a molecular level throughout the particle. Some examples of homogeneous palladium alloy compositions include those with molar compositions 50:50 Pd—Ni, 80:20 Pd—Ni, 40:60 Pd—Ni, 60:40 Pd—Co, 30:70 Pd—Co, 70:30 Pd—Fe, 60:20:20 Pd—Ni—Co, 40:40:20 Pd—Ni—Fe, 90:5:5 Pd—Fe—Co, 60:20:10:10 Pd—Ni—Co—Fe, 50:50 Pd—Au, 80:20 Pd—Au, 20:80 Pd—Au, 10:90 Pd—Au, and 1:99 Pd—Au compositions.

Alternatively, the palladium alloy core is in a heterogeneous form. In a heterogeneous form, the palladium and the alloying component(s) are distributed with varying composition, i.e., non-uniformly, in the palladium alloy core. In such cases, there is a palladium component on the surface of the palladium alloy core.

For example, a heterogeneous palladium alloy core can have individual palladium grains intermingled with individual cobalt or carbon grains throughout the core; or alternatively, for example, a carbon, cobalt, nickel, iron, copper, ruthenium, gold, or silver sub-core surrounded by a palladium shell. Some other examples of heterogeneous palladium alloy compositions include a palladium shell on a sub-core of silicon, silicon oxide, silicon nitride, titanium oxide, aluminum oxide, iron oxide, metal salt, latex, carbon, and so on.

In addition, a palladium alloy core can have a combination of a homogeneous component and a heterogeneous component. An example of such a palladium alloy core is one that contains a homogeneous subcore of palladium alloy coated with a shell of palladium metal. Another example of such a palladium alloy core is one that contains a homogeneous phase of a palladium alloy in combination with one or more interlayers of palladium.

In another embodiment, the metal alloy core is a homogeneous or heterogeneous alloy of two or more metals selected from palladium, rhenium, gold, rhodium, iridium, ruthenium, and osmium. Some examples of such binary metal alloy compositions include the alloys of palladium-gold, palladium-rhodium, palladium-iridium, palladium-ruthenium, palladium-osmium, palladium-rhenium, rhodium-gold, iridium-gold, ruthenium-gold, osmium-gold, rhenium-gold, iridium-rhodium, ruthenium-rhodium, osmium-rhodium, rhenium-rhodium, ruthenium-iridium, osmium-iridium, rhenium-iridium, osmium-ruthenium, rhenium-ruthenium, and rhenium-osmium.

Particularly preferred binary alloy compositions for the metal alloy core are the rhenium-based compositions. Some preferred rhenium compositions are the rhenium-gold and rhenium-iridium compositions. The molar percentage of rhenium in these compositions is not particularly limited. For example, rhenium can be in a minimum amount of approximately 0.5, 1, 5, 10, 20, 30, or 40 molar percent, or in a maximum amount of approximately 50, 60, 70, 80, 90, 95, or 99 molar percent. Rhenium can be in any suitable range, and particularly, any suitable range resulting from a combination of the minimum and maximum molar percents described.

Some examples of ternary metal alloy compositions suitable for the metal alloy core include the homogeneous and heterogeneous alloys of palladium-gold-rhodium, palladium-rhodium-iridium, palladium-iridium-gold, palladium-ruthenium-rhodium, palladium-rhenium-gold, palladium-rhenium-iridium, palladium-rhenium-rhodium, palladiumrhenium-ruthenium, rhenium-rhodium-gold, rhenium-iridium-gold, rhenium-ruthenium-gold, rhenium-iridium-rhodium, rhenium-rhodium-ruthenium, rhenium-iridium-ruthenium, and rhenium-iridium-osmium.

In a further embodiment, the metal alloy core is composed of one or more zerovalent or charged second row (4d) and/or third row (5d) transition metals in combination with one or more first row (3d) transition metals. For example, the metal alloy core can be a homogeneous or heterogeneous alloy composed of, minimally, one or a combination of second row and/or third row transition metals in combination with one or a combination of first row transition metals.

The first row (3d) transition metals refer to the row of transition metals starting with scandium (Sc). Some examples of suitable first row transition metals include titanium (Ti), vanadium (V), chromium (Cr), manganese (Mn), iron (Fe), cobalt (Co), nickel (Ni), copper (Cu), and zinc (Zn).

The second row (4d) transition metals refer to the row of transition metals starting with yttrium (Y). Some examples of suitable second row transition metals include molybdenum (Mo), technetium (Tc), ruthenium (Ru), rhodium (Rh), palladium (Pd), and silver (Ag).

The third row (5d) transition metals refer to the row of transition metals starting with hafnium (Hf). Some examples of suitable third row transition metals include tantalum (Ta), tungsten (W), rhenium (Re), osmium (Os), iridium (Ir), platinum (Pt), and gold (Au).

The one or combination of second row and/or third row transition metals in the metal alloy core are preferably noble metals. Some examples of suitable noble metals include palladium, gold, rhodium, iridium, ruthenium, osmium, rhenium, and combinations thereof.

In a further embodiment, the metal alloy core is composed of one or a combination of zerovalent or charged second row and/or third row transition metal atoms in combination with one or a combination of first row transition metal atoms. The metal alloy core can be in the form of a binary, ternary, quaternary, pentanary, or higher alloy of any combination of these metals.

Preferably, the zerovalent or charged second row and/or third row transition metal atoms in the metal alloy core are selected from gold, rhodium, iridium, ruthenium, osmium, and rhenium.

Preferably, the first row transition metals in the metal alloy core are selected from nickel, cobalt, and iron. More preferably, at least a portion of the one or combination of first row transition metal atoms is zerovalent.

In one embodiment, the metal alloy core includes one second row or third row transition metal in combination with one first row transition metal to make a binary alloy composition. Such a binary alloy can be represented by the molar composition formulas $M_nT$ (1a) or $MT_p$ (1b) wherein M represents a second row or third row transition metal and T represents a first row transition metal.

In formulas (1a) and (1b), n and p independently represent an integer of 1 or above. In formula (1a), n represents the number of M metal atoms per T metal atoms, i.e., the ratio M:T of n:1. In formula (1b), p represents the number of T metal atoms per M metal atoms, i. e., the molar ratio T:M of p:1. The values of n in formula (1a) can range, for example, from approximately 1000 to 1.

For example, $AuNi_{10}$ represents a binary alloy having a molar composition of ten nickel atoms per gold atom. $Au_2Ni$ represents a binary alloy having a molar composition of two gold atoms per nickel atom. Similarly, $Au_4Ni$ represents a binary alloy having a molar composition of four gold atoms per nickel atom.

Alternatively, such a binary alloy composition can be represented by the molar percentage formula $M_{1-x}T_x$ (2a). Formula (2a) is related to formula (1a) in that x is a fractional number equivalent to $1/(n+1)$. Accordingly, $Au_2Ni$ according to formula (1a) corresponds approximately to $Au_{0.67}Ni_{0.33}$ according to formula (2a). Similarly, $Au_3Ni$ corresponds to $Au_{0.75}Ni_{0.25}$ (molar composition of 75% Au and 25% Ni) and $Au_4Ni$ corresponds to $Au_{0.8}Ni_{0.2}$ (a molar composition of 80% Au and 20% Ni). Similarly, $AuNi_{10}$ corresponds approximately to $Au_{0.09}Ni_{0.91}$ (molar composition of 9% Au and 91% Ni).

In formula (2a), the value of x is not particularly limited. For example, x can have a minimum value of about 0.001, 0.005, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.25, 0.3, 0.35, 0.4, 0.45, or 0.5. Alternatively, x can have a maximum value of about 0.999, 0.99, 0.95, 0.9, 0.85, 0.8, 0.75, 0.7, 0.65, 0.6, or 0.55. Still further, x can be in a range governed by any suitable combination of such minimum and maximum values.

In one embodiment, the binary alloy composition of the metal alloy core is a combination of one second row transition metal and one first row transition metal. Some examples of classes of such binary alloy compositions suitable for the metal alloy core include the ruthenium-nickel, ruthenium-cobalt, ruthenium-iron, rhodium-nickel, rhodium-cobalt, and rhodium-iron classes of binary alloy compositions.

Some examples of ruthenium-nickel binary alloy compositions suitable for the metal alloy core include the approximate molar compositions $Ru_{0.01}Ni_{0.99}$, $Ru_{0.05}Ni_{0.95}$ (e.g., $RuNi_{20}$), $Ru_{0.1}Ni_{0.9}$ (e.g., $RuNi_9$, $RuNi_{10}$, $RuNi_{11}$), $Ru_{0.2}Ni_{0.8}$, $Ru_{0.3}Ni_{0.7}$, $Ru_{033}Ni_{0.67}$ (i.e., $RuNi_2$), $Ru_{0.4}Ni_{0.6}$, $Ru_{0.5}Ni_{0.5}$ (i.e., RuNi), $Ru_{0.6}Ni_{0.4}$, $Ru_{0.67}Ni_{0.33}$ (i.e., $Ru_2Ni$), $Ru_{0.7}Ni_{0.3}$, $Ru_{0.75}Ni_{0.25}$ (ie., $Ru_3Ni$), $Ru_{0.8}Ni_{0.2}$ (i.e., $Ru_4Ni$), $Ru_{0.9}Ni_{0.1}$, and $Ru_{0.99}Ni_{0.0}$.

Some examples of ruthenium-cobalt binary alloy compositions suitable for the metal alloy core include the approximate molar compositions $Ru_{0.01}Co_{0.99}$, $Ru_{0.05}Co_{0.95}$ (e.g., $RuCo_{20}$), $Ru_{0.1}Co_{0.9}$ (e.g., $RuCo_9$, $RuCo_{10}$, and $RuCo_{11}$), $Ru_{0.2}Co_{0.8}$, $Ru_{0.3}Co_{0.7}$, $Ru_{0.33}Co_{0.67}$ (i.e., $RuCo_2$), $Ru_{0.4}Co_{0.6}$, $Ru_{0.5}Co_{0.5}$ (i.e., RuCo), $Ru_{0.6}Co_{0.4}$, $Ru_{0.67}Co_{0.33}$ (i.e., $Ru_2Co$), $Ru_{0.7}Co_{0.3}$, $Ru_{0.75}Co_{0.25}$ (i.e., $Ru_3Co$), $Ru_{0.8}Co_{0.2}$ (i.e., $Ru_4Co$), $Ru_{0.9}Co_{0.1}$, and $Ru_{0.99}Co_{0.01}$.

Some examples of ruthenium-iron binary alloy compositions suitable for the metal alloy core include the approximate molar compositions $Ru_{0.01}Fe_{0.99}$, $Ru_{0.05}Fe_{0.95}$ (e.g., $RuFe_{20}$), $Ru_{0.1}Fe_{0.9}$ (e.g., $RuFe_9$, $RuFe_{10}$, $RuFe_{11}$), $Ru_{0.2}Fe_{0.8}$, $Ru_{0.3}Fe_{0.7}$, $Ru_{0.33}Fe_{0.67}$ (i.e., $RuFe_2$), $Ru_{0.4}Fe_{0.6}$, $Ru_{0.5}Fe_{0.5}$ (i.e., RuFe), $Ru_{0.6}Fe_{0.4}$, $Ru_{0.67}Fe_{0.33}$ (i.e., $Ru_2Fe$), $Ru_{0.7}Fe_{0.3}$, $Ru_{0.75}Fe_{0.25}$ (i.e., $Ru_3Fe$), $Ru_{0.8}Fe_{0.2}$ (i.e., $Ru_4Fe$), $Ru_{0.9}Fe_{0.1}$, and $Ru_{0.99}Fe_{0.01}$.

Some examples of rhodium-nickel binary alloy compositions suitable for the metal alloy core include the approximate molar compositions $Rh_{0.01}Ni_{0.99}$, $Rh_{0.05}Ni_{0.95}$ (e.g., $RhNi_{20}$), $Rh_{0.1}Ni_{0.9}$ (e.g., $RhNi_9$, $RhNi_{10}$, $RhNi_{11}$), $Rh_{0.2}Ni_{0.8}$, $Rh_{0.3}Ni_{0.7}$, $Rh_{0.33}Ni_{0.67}$ (i.e., $RhNi_2$), $Rh_{0.4}Ni_{0.6}$, $Rh_{0.5}Ni_{0.5}$ (i.e., RhNi), $Rh_{0.6}Ni_{0.4}$, $Rh_{0.67}Ni_{0.33}$ (i.e., $Rh_2Ni$), $Rh_{0.7}Ni_{0.3}$, $Rh_{0.75}Ni_{0.25}$ (i.e., $Rh_3Ni$), $Rh_{0.8}Ni_{0.2}$ (i.e., $Rh_4Ni$), $Rh_{0.9}Ni_{0.1}$, and $Rh_{0.99}Ni_{0.01}$.

Some examples of rhodium-cobalt binary alloy compositions suitable for the metal alloy core include the approximate molar compositions $Rh_{0.01}Co_{0.99}$, $Rh_{0.05}Co_{0.95}$ (e.g., $RhCo_{20}$), $Rh_{0.1}Co_{0.9}$ (e.g., $RhCo_9$, $RhCo_{10}$, $RhCo_{11}$), $Rh_{0.2}Co_{0.8}$, $Rh_{0.3}Co_{0.7}$, $Rh_{0.33}Co_{0.67}$ (i.e., $RhCo_2$), $Rh_{0.4}Co_{0.6}$, $Rh_{0.5}Co_{0.5}$ (i.e., RhCo), $Rh_{0.6}Co_{0.4}$, $Rh_{0.67}Co_{0.33}$ (i.e., $Rh_2Co$), $Rh_{0.7}Co_{0.3}$, $Rh_{0.75}Co_{0.25}$ (i.e., $Rh_3Co$), $Rh_{0.8}Co_{0.2}$ (i.e., $Rh_4Co$), $Rh_{0.9}Co_{0.1}$, and $Rh_{0.99}Co_{0.01}$.

Some examples of rhodium-iron binary alloy compositions suitable for the metal alloy core include the approximate molar compositions $Rh_{0.01}Fe_{0.99}$, $Rh_{0.05}Fe_{0.95}$ (e.g., $RhFe_{20}$), $Rh_{0.1}Fe_{0.9}$ (e.g., $RhFe_9$, $RhFe_{10}$, $RhFe_{11}$), $Rh_{0.2}Fe_{0.8}$, $Rh_{0.3}Fe_{0.7}$, $Rh_{0.33}Fe_{0.67}$ (i.e., $RhFe_2$), $Rh_{0.4}Fe_{0.6}$, $Rh_{0.5}Fe_{0.5}$ (i.e., RhFe), $Rh_{0.6}Fe_{0.4}$, $Rh_{0.66}Fe_{0.33}$ (i.e., $Rh_2Fe$), $Rh_{0.7}Fe_{0.3}$, $Rh_{0.75}Fe_{0.25}$ (i.e., $Rh_3Fe$), $Rh_{0.8}Fe_{0.2}$ (i.e., $Rh_4Fe$), $Rh_{0.9}Fe_{0.1}$, and $Rh_{0.99}Fe_{0.01}$.

In another embodiment, the binary alloy composition of the metal alloy core is a combination of one third row transition metal and one first row transition metal. Some examples of classes of such binary alloy compositions suitable for the metal alloy core include the gold-nickel, gold-cobalt, gold-iron, rhenium-nickel, rhenium-cobalt, rhenium-nickel, iridium-nickel, iridium-cobalt, iridium-iron, osmium-nickel, osmium-cobalt, and osmium-iron classes of binary alloy compositions.

Some examples of gold-nickel binary alloy compositions suitable for the metal alloy core include the approximate molar compositions $Au_{0.01}Ni_{0.99}$, $Au_{0.05}Ni_{0.95}$ (e.g., $AuNi_{20}$), $Au_{0.1}Ni_{0.9}$ (e.g., $AuNi_9$, $AuNi_{10}$, $AuNi_{11}$), $Au_{0.2}Ni_{0.8}$, $Au_{0.3}Ni_{07}$, $Au_{0.33}Ni_{0.67}$ (ie., $AuNi_2$), $Au_{0.4}Ni_{0.6}$, $Au_{0.5}Ni_{0.5}$ (i.e., AuNi), $Au_{0.6}Ni_{0.4}$, $Au_{0.67}Ni_{0.33}$ (i.e., $Au_2Ni$), $Au_{0.7}Ni_{0.3}$, $Au_{0.75}Ni_{0.25}$ (i.e., $Au_3Ni$), $Au_{0.8}Ni_{0.2}$ (ie., $Au_4Ni$), $Au_{0.9}Ni_{0.1}$, and $Au_{0.99}Ni_{0.01}$.

Some examples of gold-cobalt binary alloy compositions suitable for the metal alloy core include the approximate molar compositions $Au_{0.01}Co_{0.99}$, $Au_{0.05}Co_{0.95}$ (e.g., $AuCo_{20}$), $Au_{0.1}Co_{0.9}$ (e.g., $AuCo_9$, $AuCo_{10}$, and $AuCo_{11}$), $Au_{0.2}Co_{0.8}$, $Au_{0.3}Co_{0.7}$, $Au_{0.33}Co_{0.67}$ (i.e., $AuCo_2$), $Au_{0.4}Co_{0.6}$, $Au_{0.5}Co_{0.5}$ (i.e., AuCo), $Au_{0.6}Co_{0.4}$, $Au_{0.67}Co_{0.33}$ (i.e., $Au_2Co$), $Au_{0.7}Co_{0.3}$, $Au_{0.75}Co_{0.25}$ (i.e., $Au_3Co$), $Au_{0.8}Co_{0.2}$ (i.e., $Au_4Co$), $Au_{0.9}Co_{0.1}$, and $Au_{0.99}Co_{0.01}$.

Some examples of gold-iron binary alloy compositions suitable for the metal alloy core include the approximate molar compositions $Au_{0.01}Fe_{0.99}$, $Au_{0.05}Fe_{0.95}$ (e.g., $AuFe_{20}$), $Au_{0.1}Fe_{0.9}$ (e.g., $AuFe_9$, $AuFe_{10}$, $AuFe_{11}$), $Au_{0.2}Fe_{0.8}$, $Au_{0.3}Fe_{0.7}$, $Au_{0.33}Fe_{0.67}$ (i.e., $AuFe_2$), $Au_{0.4}Fe_{0.6}$, $Au_{0.5}Fe_{0.5}$ (i.e., AuFe), $Au_{0.6}Fe_{0.4}$, $Au_{0.67}Fe_{0.33}$ (i.e., $Au_2Fe$), $Au_{0.7}Fe_{0.3}$, $Au_{0.75}Fe_{0.25}$ (i.e., $Au_3Fe$), $Au_{0.8}Fe_{0.2}$ (i.e., $Au_4Fe$), $Au_{0.9}Fe_{0.1}$, and $Au_{0.99}Fe_{0.01}$.

Some examples of rhenium-nickel binary alloy compositions suitable for the metal alloy core include the approximate molar compositions $Re_{0.01}Ni_{0.99}$, $Re_{0.05}Ni_{0.95}$ (e.g., $ReNi_{20}$), $Re_{0.1}Ni_{0.9}$ (e.g., $ReNi_9$, $ReNi_{10}$, $ReNi_{11}$), $Re_{0.2}Ni_{0.8}$, $Re_{0.3}Ni_{0.7}$, $Re_{0.33}Ni_{0.67}$ (i.e., $ReNi_2$), $Re_{0.4}Ni_{0.6}$, $Re_{0.5}Ni_{0.5}$ (i.e., ReNi), $Re_{0.6}Ni_{0.4}$, $Re_{0.67}Ni_{0.33}$ (i.e., $Re_2Ni$), $Re_{0.7}Ni_{0.3}$, $Re_{0.75}Ni_{0.25}$ (i.e., $Re_3Ni$), $Re_{0.8}Ni_{0.2}$ (i.e., $Re_4Ni$), $Re_{0.9}Ni_{0.1}$, and $Re_{0.99}Ni_{0.01}$.

Some examples of rhenium-cobalt binary alloy compositions suitable for the metal alloy core include the approximate molar compositions $Re_{0.01}Co_{0.99}$, $Re_{00.5}Co_{0.95}$ (e.g., $ReCo_{20}$), $Re_{0.1}Co_{0.9}$ (e.g., $ReCo_9$, $ReCo_{10}$, and $ReCo_{11}$), $Re_{0.2}Co_{0.8}$, $Re_{0.3}Co_{0.7}$, $Re_{0.33}Co_{0.67}$ (i.e., $ReCo_2$), $Re_{0.4}Co_{0.6}$, $Re_{0.5}Co_{0.5}$ (i e., ReCo), $Re_{0.6}Co_{0.4}$, $Re_{0.67}Co_{0.33}$ (i.e., $Re_2Co$), $Re_{0.7}Co_{0.3}$, $Re_{0.75}Co_{0.25}$ (i.e., $Re_3Co$), $Re_{0.8}Co_{0.2}$ (i.e., $Re_4Co$), $Re_{0.9}Co_{0.1}$, and $Re_{0.99}Co_{0.01}$.

Some examples of rhenium-iron binary alloy compositions suitable for the metal alloy core include the approximate molar compositions $Re_{0.01}Fe_{0.99}$, $Re_{0.05}Fe_{0.95}$ (e.g., $ReFe_{20}$), $Re_{0.01}Fe_{0.9}$ (e.g., $ReFe_9$, $ReFe_{10}$, $ReFe_{11}$), $Re_{0.2}Fe_{0.8}$, $Re_{0.3}Fe_{0.7}$, $Re_{0.33}Fe_{0.67}$ (i.e., $ReFe_2$), $Re_{0.4}Fe_{0.6}$, $Re_{0.5}Fe_{0.5}$ (i.e., ReFe), $Re_{0.6}Fe_{0.4}$, $Re_{0.67}Fe_{0.33}$ (i.e., $Re_2Fe$), $Re_{0.7}Fe_{0.3}$, $Re_{0.75}Fe_{0.25}$ (i.e., $Re_3Fe$), $Re_{0.8}Fe_{0.2}$ (i.e., $Re_4Fe$), $Re_{0.9}Fe_{0.1}$, and $Re_{0.99}Fe_{0.01}$.

Some examples of iridium-nickel binary alloy compositions suitable for the metal alloy core include the approximate molar compositions $Ir_{0.01}Ni_{0.99}$, $Ir_{0.05}Ni_{0.95}$ (e.g., $IrNi_{20}$), $Ir_{0.1}Ni_{0.9}$ (e.g., $IrNi_9$, $IrNi_{10}$, $IrNi_{11}$), $Ir_{0.2}Ni_{0.8}$, $Ir_{0.3}Ni_{0.7}$, $Ir_{0.33}Ni_{0.67}$ (i.e., $IrNi_2$), $Ir_{0.4}Ni_{0.6}$, $Ir_{0.5}Ni_{0.5}$ (i.e., IrNi), $Ir_{0.6}Ni_{0.4}$, $Ir_{0.67}Ni_{0.33}$ (i.e., $Ir_2Ni$), $Ir_{0.7}Ni_{0.3}$, $Ir_{0.75}Ni_{0.25}$ (i.e., $Ir_3Ni$), $Ir_{0.8}Ni_{0.2}$ (i.e., $Ir_4Ni$), $Ir_{0.9}Ni_{0.1}$, and $Ir_{0.99}Ni_{0.01}$.

Some examples of iridium-cobalt binary alloy compositions suitable for the metal alloy core include the approximate molar compositions $Ir_{0.01}Co_{0.99}$, $Ir_{0.05}Co_{0.95}$ (e.g., $IrCo_{20}$), $Ir_{0.1}Co_{0.9}$ (e.g., $IrCo_9$, $IrCo_{10}$, and $IrCo_{11}$), $Ir_{0.2}Co_{0.8}$, $Ir_{0.3}Co_{0.7}$, $Ir_{0.33}Co_{0.67}$ (i.e., $IrCo_2$), $Ir_{0.4}Co_{0.6}$, $Ir_{0.5}Co_{0.5}$ (i.e., IrCo), $Ir_{0.6}Co_{0.4}$, $Ir_{0.67}Co_{0.33}$ (i.e., $Ir_2Co$), $Ir_{0.7}Co_{0.3}$, $Ir_{0.75}Co_{0.25}$ (i.e., $Ir_3Co$), $Ir_{0.8}Co_{0.2}$ (i.e., $Ir_4Co$), $Ir_{0.9}Co_{0.1}$, and $Ir_{0.99}Co_{0.01}$.

Some examples of iridium-iron binary alloy compositions suitable for the metal alloy core include the approximate molar compositions $Ir_{0.01}Fe_{0.99}$, $Ir_{0.05}Fe_{0.95}$ (e.g., $IrFe_{20}$), $Ir_{0.1}Fe_{0.9}$ (e.g., $IrFe_9$, $IrFe_{10}$, and $IrFe_{11}$), $Ir_{0.2}Fe_{0.8}$, $Ir_{0.3}Fe_{0.7}$, $Ir_{0.33}Fe_{0.67}$ (i.e., $IrFe_2$), $Ir_{0.4}Fe_{0.6}$, $Ir_{0.5}Fe_{0.5}$ (i.e., IrFe), $Ir_{0.6}Fe_{0.4}$, $Ir_{0.66}Fe_{0.33}$ (i.e., $Ir_2Fe$), $Ir_{0.7}Fe_{0.3}$, $Ir_{0.75}Fe_{0.25}$ (i.e., $Ir_3Fe$), $Ir_{0.8}Fe_{0.2}$ (i.e., $Ir_4Fe$), $Ir_{0.9}Fe_{0.1}$, and $Ir_{0.99}Fe_{0.01}$.

Some examples of osmium-nickel binary alloy compositions suitable for the metal alloy core include the approximate molar compositions $Os_{0.01}Ni_{0.99}$, $Os_{0.05}Ni_{0.95}$ (e.g., $OsNi_{20}$), $Os_{0.1}Ni_{0.9}$ (e.g., $OsNi_9$, $OsNi_{10}$, $OsNi_{11}$), $Os_{0.2}Ni_{0.8}$, $Os_{0.3}Ni_{0.7}$, $Os_{0.33}Ni_{0.67}$ (i.e., $OsNi_2$), $Os_{0.4}Ni_{0.6}$, $Os_{0.5}Ni_{0.5}$ (ie., OsNi), $Os_{0.6}Ni_{0.4}$, $Os_{0.67}Ni_{0.33}$ (i.e., $Os_2Ni$), $Os_{0.7}Ni_{0.3}$, $Os_{0.75}Ni_{0.25}$ (i.e., $Os_3Ni$), $Os_{0.8}Ni_{0.2}$ (ie., $Os_4Ni$), $Os_{0.9}Ni_{0.1}$, and $Os_{0.99}Ni_{0.01}$.

Some examples of osmium-cobalt binary alloy compositions suitable for the metal alloy core include the approximate molar compositions $Os_{0.01}Co_{0.99}$, $Os_{0.05}Co_{0.95}$ (e.g., $OsCo_{20}$), $Os_{0.1}Co_{0.9}$ (e.g., $OsCo_9$, $OsCo_{10}$, and $OsCo_{11}$), $Os_{0.2}Co_{0.8}$, $Os_{0.3}Co_{0.7}$, $Os_{0.33}Co_{0.67}$ (i.e., $OsCo_2$), $Os_{0.4}Co_{0.6}$, $Os_{0.5}Co_{0.5}$ (i.e., OsCo), $Os_{0.6}Co_{0.4}$, $Os_{0.67}Co_{0.33}$ (i.e., $Os_2Co$), $Os_{0.7}Co_{0.3}$, $Os_{0.75}Co_{0.25}$ (i.e., $Os_3Co$), $Os_{0.8}Co_{0.2}$ (i.e., $Os_4Co$), $Os_{0.9}Co_{0.1}$, and $Os_{0.99}Co_{0.01}$.

Some examples of osmium-iron binary alloy compositions suitable for the metal alloy core include the approximate molar compositions $Os_{0.01}Fe_{0.99}$, $Os_{0.05}Fe_{0.95}$ (e.g., $OsFe_{20}$), $Os_{0.1}Fe_{0.9}$ (e.g., $OsFe_9$, $OsFe_{10}$, $OsFe_{11}$), $Os_{0.2}Fe_{0.8}$, $Os_{0.3}Fe_{0.7}$, $Os_{0.33}Fe_{0.67}$ (i.e., $OsFe_2$), $Os_{0.4}Fe_{0.6}$, $Os_{0.5}Fe_{0.5}$ (i.e., OsFe), $Os_{0.6}Fe_{0.4}$, $Os_{0.67}Fe_{0.33}$ (i.e., $Os_2Fe$), $Os_{0.7}Fe_{0.3}$, $Os_{0.75}Fe_{0.25}$ (i.e., $Os_3Fe$), $Os_{0.8}Fe_{0.2}$ (i.e., $Os_4Fe$), $Os_{0.9}Fe_{0.1}$, and $Os_{0.99}Fe_{0.0}$.

In another embodiment, the metal alloy core is in the form of a ternary alloy composition. Such a ternary alloy composition can be represented by the molar composition formula $M_{1-x-y}N_xT_y$ (3a) wherein one or two of M, N, and T independently represent second row or third row transition metals and one or two of M, N, T independently represent first row transition metals. The values of x and y are independently as described for x above under formula (2a). By the rules of chemistry, the sum of x and y in formula (3a) must be less than 1.

In one embodiment, the metal alloy core is in the form of a ternary alloy composition having two second row transition metals and one first row transition metal. Some examples of classes of such ternary alloy compositions suitable for the metal alloy core include the ruthenium-rhodium-nickel, ruthenium-rhodium-cobalt, and ruthenium-rhodium-iron classes of ternary alloy compositions.

Some examples of ruthenium-rhodium-nickel ternary alloy compositions suitable for the metal alloy core include the approximate molar compositions $Ru_{0.025}Rh_{0.025}Ni_{0.95}$, $Ru_{0.05}Rh_{0.05}Ni_{0.9}Ru_{0.1}Rh_{0.1}Ni_{0.8}$, $Ru_{0.1}Rh_{0.2}Ni_{0.7}$, $Ru_{0.2}Rh_{0.1}Ni_{0.7}$, $Ru_{0.2}Rh_{0.2}Ni_{0.6}$, $Ru_{0.3}Rh_{0.1}Ni_{0.6}$, $Ru_{0.1}Rh_{0.3}Ni_{0.6}$, $Ru_{0.25}Rh_{0.25}Ni_{0.5}$ (i.e., $RuRhNi_2$), $Ru_{0.4}Rh_{0.1}Ni_{0.5}$, $Ru_{0.1}Rh_{0.4}Ni_{0.5}$, $Ru_{0.3}Rh_{0.3}Ni_{0.4}$, $Ru_{0.4}Rh_{0.2}Ni_{0.4}$, $Ru_{0.2}Rh_{0.4}Ni_{0.4}$, $Ru_{0.33}Rh_{0.33}Ni_{0.33}$ (i.e., RuRhNi), $Ru_{0.3}Rh_{0.4}Ni_{0.3}$, $Ru_{0.5}Rh_{0.2}Ni_{0.3}$, $Ru_{0.2}Rh_{0.5}Ni_{0.3}$, $Ru_{0.6}Rh_{0.1}Ni_{0.3}$, $Ru_{0.1}Rh_{0.6}Ni_{0.3}$, $Ru_{0.4}Rh_{0.4}Ni_{0.2}, Ru_{0.6}Rh_{0.2}Ni_{0.2}$, $Ru_{0.2}Rh_{0.6}Ni_{0.2}$, $Ru_{0.45}Rh_{0.45}Ni_{0.1}$, $Ru_{0.6}Rh_{0.3}Ni_{0.1}$, $Ru_{0.3}Rh_{0.6}Ni_{0.1}$, $Ru_{0.8}Rh_{0.1}Ni_{0.1}$, and $Ru_{0.1}Rh_{0.8}Ni_{0.1}$.

Some examples of ruthenium-rhodium-cobalt ternary alloy compositions suitable for the metal alloy core include the approximate molar compositions $Ru_{0.025}Rh_{0.025}Co_{0.95}$, $Ru_{0.05}Rh_{0.05}Co_{0.9}$, $Ru_{0.1}Rh_{0.1}Co_{0.8}$, $Ru_{0.1}Rh_{0.2}Co_{0.7}$, $Ru_{0.2}Rh_{0.1}Co_{0.7}$, $Ru_{0.2}Rh_{0.2}Co_{0.6}$, $Ru_{0.3}Rh_{0.1}Co_{0.6}$, $Ru_{0.1}Rh_{0.3}Co_{0.6}$, $Ru_{0.25}Rh_{0.25}Co_{0.5}$ (i.e., $RuRhCo_2$), $Ru_{0.4}Rh_{0.1}Co_{0.5}$, $Ru_{0.1}Rh_{0.4}Co_{0.5}$, $Ru_{0.3}Rh_{0.3}Co_{0.4}$, $Ru_{0.4}Rh_{0.2}Co_{0.4}$, $Ru_{0.2}Rh_{0.4}Co_{0.4}$, $Ru_{0.33}Rh_{0.33}Co_{0.33}$ (i.e., RuRhCo), $Ru_{0.3}Rh_{0.4}Co_{0.3}$, $Ru_{0.5}Rh_{0.2}Co_{0.3}$, $Ru_{0.2}Rh_{0.5}Co_{0.3}$, $Ru_{0.6}Rh_{0.1}Co_{0.3}$, $Ru_{0.1}Rh_{0.6}Co_{0.3}$, $Ru_{0.4}Rh_{0.4}Co_{0.2}$, $Ru_{0.6}Rh_{0.2}Co_{0.2}$, $Ru_{0.2}Rh_{0.6}Co_{0.2}$, $Ru_{0.45}Rh_{0.45}Co_{0.1}$, $Ru_{0.6}Rh_{0.3}Co_{0.1}$, $Ru_{0.3}Rh_{0.6}Co0.1$, $Ru_{0.8}Rh_{0.1}Co_{0.1}$, and $Ru_{0.1}Rh_{0.8}Co_{0.1}$.

Some examples of ruthenium-rhodium-iron ternary alloy compositions suitable for the metal alloy core include the approximate molar compositions $Ru_{0.025}Rh_{0.025}Fe_{0.95}$, $Ru_{0.05}Rh_{0.05}Fe_{0.9}$, $Ru_{0.1}Rh_{0.1}Fe_{0.8}$, $Ru_{0.1}Rh_{0.2}Fe_{0.7}$, $Ru_{0.2}Rh_{0.1}Fe_{0.7}$, $Ru_{0.2}Rh_{0.2}Fe_{0.6}$, $Ru_{0.3}Rh_{0.1}Fe_{0.6}$, $Ru_{0.1}Rh_{0.3}Fe_{0.6}$, $Ru_{0.25}Rh_{0.25}Fe_{0.5}$ (i.e., $RuRhFe_2$), $Ru_{0.4}Rh_{0.1}Fe_{0.5}$, $Ru_{0.1}Rh_{0.4}Fe_{0.5}$, $Ru_{0.3}Rh_{0.3}Fe_{0.4}$, $Ru_{0.4}Rh_{0.2}Fe_{0.4}$, $Ru_{0.2}Rh_{0.4}Fe_{0.4}$, $Ru_{0.33}Rh_{0.33}Fe_{0.33}$ (i.e., RuRhFe), $Ru_{0.3}Rh_{0.4}Fe_{0.3}$, $Ru_{0.5}Rh_{0.2}Fe_{0.3}$, $Ru_{0.2}Rh_{0.5}Fe_{0.3}$, $Ru_{0.6}Rh_{0.1}Fe_{0.3}$, $Ru_{0.1}Rh_{0.6}Fe_{0.3}$, $Ru_{0.4}Rh_{0.4}Fe_{0.2}$, $Ru_{0.6}Rh_{0.2}Fe_{0.2}$, $Ru_{0.2}Rh_{0.6}Fe_{0.2}$, $Ru_{0.45}Rh_{0.45}Fe_{0.1}$, $Ru_{0.6}Rh_{0.3}Fe_{0.1}$, $Ru_{0.3}Rh_{0.6}Fe_{0.1}$, $Ru_{0.8}Rh_{0.1}Fe_{0.1}$, and $Ru_{0.1}Rh_{0.8}Fe_{0.1}$.

In another embodiment, the metal alloy core is in the form of a ternary alloy composition having two third row transition metals and one first row transition metal. Some examples of classes of such ternary alloy compositions suitable for the metal alloy core include the gold-rhenium-nickel, gold-rhenium-cobalt, gold-rhenium-iron, gold-iridium-nickel, gold-iridium-cobalt, gold-iridium-iron, gold-osmium-nickel, gold-osmium-cobalt, gold-osmium-iron, rhenium-iridium-nickel, rhenium-iridium-cobalt, rhenium-iridium-iron, rhenium-osmium-nickel, rhenium-osmium-cobalt, rhenium-osmium-iron, iridium-osmium-nickel, iridium-osmium-cobalt, and iridium-osmium-iron classes of ternary alloy compositions.

Some examples of gold-rhenium-nickel ternary alloy compositions suitable for the metal alloy core include the approximate molar compositions $Au_{0.025}Re_{0.025}Ni_{0.95}$, $Au_{0.05}Re_{0.05}Ni_{0.9}$, $Au_{0.1}Re_{0.1}Ni_{0.8}$, $Au_{0.1}Re_{0.2}Ni_{0.7}$, $Au_{0.2}Re_{0.1}Ni_{0.7}$, $Au_{0.2}Re_{0.2}Ni_{0.6}$, $Au_{0.3}Re_{0.1}Ni_{0.6}$, $Au_{0.1}Re_{0.3}Ni_{0.6}$, $Au_{0.25}Re_{0.25}Ni_{0.5}$ (i.e., $AuReNi_2$), $Au_{0.4}Re_{0.1}Ni_{0.5}$, $Au_{0.1}Re_{0.4}Ni_{0.5}$, $Au_{0.3}Re_{0.3}Ni_{0.4}$, $Au_{0.4}Re_{0.2}Ni_{0.4}$, $Au_{0.2}Re_{0.4}Ni_{0.4}$, $Au_{0.33}Re_{0.33}Ni_{0.33}$ (i.e., AuReNi), $Au_{0.3}Re_{0.4}Ni_{0.3}$, $Au_{0.5}Re_{0.2}Ni_{0.3}$, $Au_{0.2}Re_{0.5}Ni_{0.3}$, $Au_{0.6}Re_{0.1}Ni_{0.3}$, $Au_{0.1}Re_{0.6}Ni_{0.3}$, $Au_{0.4}Re_{0.4}Ni_{0.2}$, $Au_{0.6}Re_{0.2}Ni_{0.2}$, $Au_{0.2}Re_{0.6}Ni_{0.2}$, $Au_{0.45}Re_{0.45}Ni_{0.1}$, $Au_{0.6}Re_{0.3}Ni_{0.1}$, $Au_{0.3}Re_{0.6}Ni_{0.1}$, $Au_{0.8}Re_{0.1}Ni_{0.1}$, and $Au_{0.1}Re_{0.8}Ni_{0.1}$.

Some examples of gold-rhenium-cobalt ternary alloy compositions suitable for the metal alloy core include the approximate molar compositions $Au_{0.025}Re_{0.025}Co_{0.95}$, $Au_{0.05}Re_{0.05}Co_{0.9}$, $Au_{0.1}R_{0.1}Co_{0.8}$, $Au_{0.1}Re_{0.2}Co_{0.7}$, $Au_{0.2}Re_{Co0.7}$, $Au_{0.2}Re_{0.2}Co_{0.6}$, $Au_{0.3}Re_{0.1}Co_{0.6}$, $Au_{0.1}Re_{0.3}Co_{0.6}$, $Au_{0.25}Re_{0.25}Co_{0.5}$ (i.e., $AuReCo_2$), $Au_{0.4}Re_{0.1}Co_{0.5}$, $Au_{0.1}Re_{0.4}Co_{0.5}$, $Au_{0.3}Re_{0.3}Co_{0.4}$, $Au_{0.4}Re_{0.2}Co_{0.4}$, $Au_{0.2}Re_{0.4}Co_{0.4}$, $Au_{0.33}Re_{0.33}Co_{0.33}$ (i.e., AuReCo), $Au_{0.3}Re_{0.4}Co_{0.3}$, $Au_{0.5}Re_{0.2}Co_{0.3}$, $Au_{0.2}Re_{0.5}Co_{0.3}$, $Au_{0.6}Re_{0.1}Co_{0.3}$, $Au_{0.1}Re_{0.6}Co_{0.3}$, $Au_{0.4}Re_{0.4}Co_{0.2}$, $Au_{0.6}Re_{0.2}C0_{0.2}$, $Au_{0.2}Re_{0.6}Co_{0.2}$, $Au_{0.45}Re_{0.45}Co_{0.1}$, $Au_{0.6}Re_{0.3}Co_{0.1}$, $Au_{0.3}Re_{0.6}Co_{0.1}$, $Au_{0.8}Re_{0.1}Co_{0.1}$, and $Au_{0.1}Re_{0.8}Co_{0.1}$.

Some examples of gold-rhenium-iron ternary alloy compositions suitable for the metal alloy core include the approximate molar compositions $Au_{0.025}Re_{0.025}Fe_{0.95}$, $Au_{0.05}Re_{0.05}Fe_{0.9}$, $Au_{0.1}Re_{0.1}Fe_{0.8}$, $Au_{0.1}Re_{0.2}Fe_{0.7}$, $Au_{0.2}Re_{0.1}Fe_{0.7}$, $Au_{0.2}Reo_{0.2}Fe_{0.6}$, $Au_{0.3}Re_{0.1}Fe_{0.6}$, $Au_{0.1}Re_{0.3}Fe_{0.6}$, $Au_{0.25}Re_{0.25}Fe_{0.5}$ (i.e., $AuReFe_2$), $Au_{0.4}Re_{0.1}Fe_{0.5}$, $Au_{0.1}Re_{0.4}Fe_{0.5}$, $Au_{0.3}Re_{0.3}Fe_{0.4}$, $Au_{0.4}Re_{0.2}Fe_{0.4}$, $Au_{0.2}Re_{0.4}Fe_{0.4}$, $Au_{0.33}Re_{0.33}Fe_{0.33}$ (i.e., AuReFe), $Au_{0.3}Re_{0.4}Fe_{0.3}$, $Au_{0.5}Re_{0.2}Fe_{0.3}$, $Au_{0.2}Re_{0.5}Fe_{0.3}$, $Au_{0.6}Re_{0.1}Fe_{0.3}$, $Au_{0.1}Re_{0.6}Fe_{0.3}$, $Au_{0.4}Re_{0.4}Fe_{0.2}$, $Au_{0.6}Re_{0.2}Fe_{0.2}$, $Au_{0.2}Re_{0.6}Fe_{0.2}$, $Au_{0.45}Re_{0.45}Fe_{0.1}$, $Au_{0.6}Re_{0.3}Fe_{0.1}$, $Au_{0.3}Re_{0.6}Fe_{0.1}$, $Au_{0.8}Re_{0.1}Fe_{0.1}$, and $Au_{0.1}Re_{0.8}Fe_{0.1}$.

Some examples of gold-iridium-nickel ternary alloy compositions suitable for the metal alloy core include the approximate molar compositions $Au_{0.025}Ir_{0.025}Ni_{0.95}$, $Au_{0.05}Ir_{0.05}Ni_{0.9}$, $Au_{0.1}Ir_{0.1}Ni_{0.8}$, $Au_{0.1}Ir_{0.2}Ni_{0.7}$, $Au_{0.2}Ir_{0.1}Ni_{0.7}$, $Au_{0.2}Ir_{0.2}Ni_{0.6}$, $Au_{0.3}Ir_{0.1}Ni_{0.6}$, $Au_{0.1}Ir_{0.3}Ni_{0.6}$, $Au_{0.25}Ir_{0.25}Ni_{0.5}$ (i.e., $AuIrNi_2$), $Au_{0.4}Ir_{0.1}Ni_{0.5}$, $Au_{0.1}Ir_{0.4}Ni_{0.5}$, $Au_{0.3}Ir_{0.3}Ni_{0.4}$, $Au_{0.4}Ir_{0.2}Ni_{0.4}$, $Au_{0.2}Ir_{0.4}Ni_{0.4}$, $Au_{0.33}Ir_{0.33}Ni_{0.33}$ (i.e., AuIrNi), $Au_{0.3}Ir_{0.4}Ni_{0.3}$, $Au_{0.5}Ir_{0.2}Ni_{0.3}$, $Au_{0.2}Ir_{0.5}Ni_{0.3}$, $Au_{0.6}Ir_{0.1}Ni_{0.3}$, $Au_{0.1}Ir_{0.6}Ni_{0.3}$, $Au_{0.4}Ir_{0.4}Ni_{0.2}$, $Au_{0.6}Ir_{0.2}Ni_{0.2}$, $Au_{0.2}Ir_{0.6}Ni_{0.2}$, $Au_{0.45}Ir_{0.45}Ni_{0.1}$, $Au_{0.6}Ir_{0.3}Ni_{0.1}$, $Au_{0.3}Ir_{0.6}Ni_{0.2}$, $Au_{0.8}Ir_{0.1}Ni_{0.1}$, and $Au_{0.1}Ir_{0.8}Ni_{0.1}$.

Some examples of gold-iridium-cobalt ternary alloy compositions suitable for the metal alloy core include the approximate molar compositions $Au_{0.025}Ir_{0.025}Co_{0.95}$, $Au_{0.05}Ir_{0.05}Co_{0.9}$, $Au_{0.1}Ir_{0.1}Co_{0.8}$, $Au_{0.1}Ir_{0.2}Co_{0.7}$, $Au_{0.2}Ir_{0.1}Co_{0.7}$, $Au_{0.2}Ir_{0.2}Co_{0.6}$, $Au_{0.3}Ir_{0.1}Co_{0.6}$, $Au_{0.1}Ir_{0.3}Co_{0.6}$, $Au_{0.25}Ir_{0.25}Co_{0.5}$ (i.e., $AuIrCo_2$), $Au_{0.4}Ir_{0.1}Co_{0.5}$, $Au_{0.1}Ir_{0.4}Co_{0.5}$, $Au_{0.3}Ir_{0.3}Co_{0.4}$, $Au_{0.4}Ir_{0.2}Co_{0.4}$, $Au_{0.2}Ir_{0.4}Co_{0.4}$, $Au_{0.33}Ir_{0.33}Co_{0.33}$ (i.e., AuIrCo), $Au_{0.3}Ir_{0.4}Co_{0.3}$, $Au_{0.5}Ir_{0.2}Co_{0.3}$, $Au_{0.2}Ir_{0.5}Co_{0.3}$, $Au_{0.6}Ir_{0.1}Co_{0.3}$, $Au_{0.1}Ir_{0.6}Co_{0.3}$, $Au_{0.4}Ir_{0.4}Co_{0.2}$, $Au_{0.6}Ir_{0.2}Co_{0.2}$, $Au_{0.2}Ir_{0.6}Co_{0.2}$, $Au_{0.45}Ir_{0.45}Co_{0.1}$, $Au_{0.6}Ir_{0.3}Co_{0.1}$, $Au_{0.3}Ir_{0.6}Co_{0.1}$, $Au_{0.8}Ir_{0.1}C_{0.1}$, and $Au_{0.1}Ir_{0.8}Co_{0.1}$.

Some examples of gold-iridium-iron ternary alloy compositions suitable for the metal alloy core include the approximate molar compositions $Au_{0.025}Ir_{0.025}Fe_{0.95}$, $Au_{0.05}Ir_{0.05}Fe_{0.9}$, $Au_{0.1}Ir_{0.1}Fe_{0.8}$, $Au_{0.1}Ir_{0.2}Fe_{0.7}$, $Au_{0.2}Ir_{0.1}Fe_{0.7}$, $Au_{0.2}Ir_{0.2}Fe_{0.6}$, $Au_{0.3}Ir_{0.1}Fe_{0.6}$, $Au_{0.1}Ir_{0.3}Fe_{0.6}$, $Au_{0.25}Ir_{0.25}Fe_{0.5}$ (i.e., $AuIrFe_2$), $Au_{0.4}Ir_{0.1}Fe_{0.5}$, $Au_{0.1}Ir_{0.4}Fe_{0.5}$, $Au_{0.3}Ir_{0.3}Fe_{0.4}$, $Au_{0.4}Ir_{0.2}Fe_{0.4}$, $Au_{0.2}Ir_{0.4}Fe_{0.4}$, $Au_{0.33}Ir_{0.33}Fe_{0.33}$ (i.e., AuIrFe), $Au_{0.3}Ir_{0.4}Fe_{0.3}$, $Au_{0.5}Ir_{0.2}Fe_{0.3}$, $Au_{0.2}Ir_{0.5}Fe_{0.3}$, $Au_{0.6}Ir_{0.1}Fe_{0.3}$, $Au_{0.1}Ir_{0.6}Fe_{0.3}$, $Au_{0.4}Ir_{0.4}Fe_{0.2}$, $Au_{0.6}Ir_{0.2}Fe_{0.2}$, $Au_{0.2}Ir_{0.6}Fe_{0.2}$, $Au_{0.45}Ir_{0.45}Fe_{0.1}$, $Au_{0.6}Ir_{0.3}Fe_{0.1}$, $Au_{0.3}Ir_{0.6}Fe_{0.1}$, $Au_{0.8}Ir_{0.1}Fe_{0.1}$, and $A_{0.1}Ir_{0.8}Fe_{0.1}$.

In another embodiment, the metal alloy core is in the form of a ternary alloy composition having one second row transition metal, one third row transition metal, and one first row transition metal. Some examples of classes of such ternary alloy compositions suitable for the metal alloy core include the gold-rhodium-nickel, gold-rhodium-cobalt, gold-rhodium-iron, gold-ruthenium-nickel, gold-ruthenium-cobalt, gold-ruthenium-iron, iridium-rhodium-nickel, iridium-rhodium-cobalt, iridium-rhodium-iron, iridium-ruthenium-nickel, iridium-ruthenium-cobalt, iridium-ruthenium-iron, rhenium-rhodium-nickel, rhenium-rhodium-cobalt, rhenium-rhodium-iron, rhenium-ruthenium-nickel, rhenium-ruthenium-cobalt, rhenium-ruthenium-iron, osmium-rhodium-nickel, osmium-rhodium-cobalt, osmium-rhodium-iron, osmium-ruthenium-nickel, osmium-ruthenium-cobalt, and osmium-ruthenium-iron classes of ternary alloy compositions.

Some examples of gold-rhodium-nickel ternary alloy compositions suitable for the metal alloy core include the approximate molar compositions $Au_{0.025}Rh_{0.025}Ni_{0.95}$, $Au_{0.05Rh0.05Ni0.9}$, $Au_{0.1}Rh_{0.1}Ni_{0.8}$, $Au_{0.1}Rh_{0.2}Ni_{0.7}$, $Au_{0.2}R_{0.1}Ni_{0.7}$, $Au_{0.2}Rh_{0.2}Ni_{0.6}$, $Au_{0.1}Rh_{0.1}Ni_{0.6}$, $Au_{0.1}Rh_{0.3}Ni_{0.6}$, $Au_{0.25}Rh_{0.25}Ni_{0.5}$ (i.e., $AuRhNi_2$), $Au_{0.4}Rh_{0.1}Ni_{0.5}$, $Au_{0.1}Rh_{0.4}Ni_{0.5}$, $Au_{0.3}Rh_{0.3}Ni_{0.4}$, $Au_{0.4}Rh_{0.2}Ni_{0.4}$, $Au_{0.2}Rh_{0.4}Ni_{0.4}$, $Au_{0.33}Rh_{0.33}Ni_{0.33}$ (i.e., AuRhNi), $Au_{0.3}Rh_{0.4}Ni_{0.3}$, $Au_{0.5}Rh_{0.2}Ni_{0.3}$, $Au_{0.2}Rh_{0.5}Ni_{0.3}$, $Au_{0.6}Rh_{0.1}Ni_{0.3}$, $Au_{0.1}Rh_{0.6}Ni_{0.3}$, $Au_{0.4}Rh_{0.4}Ni_{0.2}$, $Au_{0.6}Rh_{0.2}Ni_{0.2}$, $Au_{0.2}Rh_{0.6}Ni_{0.2}$, $Au_{0.45}Rh_{0.45}Ni_{0.1}$, $Au_{0.6}Rh_{0.3}Ni_{0.1}$, $Au_{0.3}Rh_{0.6}Ni_{0.1}$, $Au_{0.8}Rh_{0.1}Ni_{0.1}$, and $Au_{0.1}Rh_{0.8}N_{0.1}$.

Some examples of gold-rhodium-cobalt ternary alloy compositions suitable for the metal alloy core include the approximate molar compositions $Au_{0.025}Rh_{0.025}Co_{0.95}$, $Au_{0.05}Rh_{0.05}Co_{0.9}$, $Au_{0.1}Rh_{0.1}Co_{0.8}$, $Au_{0.1}Rh_{0.2}Co_{0.7}$, $Au_{0.2}Rh_{0.1}Co_{0.7}$, $Au_{0.2}Rh_{0.2}Co_{06}$, $Au_{0.3Rh0.1}Co_{0.6}$, $Au_{0.1}Rh_{0.3}Co_{0.6}$, $Au_{0.25}Rh_{0.25}Co_{0.5}$ (i.e., $AuRhCo_2$), $Au_{0.4}Rh_{0.1}Co_{0.5}$, $Au_{0.1}Rh_{0.4}Co_{0.5}$, $Au_{0.3}Rh_{0.3}Co_{0.4}$, $Au_{0.4}Rh_{0.2}Co_{0.4}$, $Au_{0.2}Rh_{0.4}Co_{0.4}$, $Au_{0.33}Rh_{0.33}Co_{0.33}$ (i.e., AuRhCo), $Au_{0.3}Rh_{04}Co_{0.3}$, $Au_{0.5}Rh_{0.2}Co_{0.3}$, $Au_{0.2}Rh_{0.5}Co_{0.3}$, $Au_{0.6}Rh_{0.1}Co_{0.3}$, $Au_{0.1}Rh_{0.6}Co_{0.3}$, $Au_{0.4}Rh_{0.4}Co_{0.2}$, $Au_{0.6Rh0.2}Co_{0.2}$, $Au_{0.2}Rh_{0.6}Co_{0.2}$, $Au_{0.45}Rh_{0.45}Co_{0.1}$, $Au_{0.6}Rh_{0.3}Co_{0.1}$, $Au_{0.3}Rh_{0.6}Co_{0.1}$, $Au_{0.8}Rh_{0.1}Co_{0.1}$, and $Au_{0.1}Rh_{0.8}Co_{0.1}$.

Some examples of gold-rhodium-iron ternary alloy compositions suitable for the metal alloy core include the approximate molar compositions $Au_{0.025}Rh_{0.025}Fe_{0.95}$, $Au_{0.05}Rh_{0.05}Fe_{0.9}$, $Au_{0.1}Rh_{0.1}Fe_{0.8}$, $Au_{0.1}Rh_{0.2}Fe_{0.7}$, $Au_{0.2}Rh_{0.1}Fe_{0.7}$, $Au_{0.2}Ph_{0.2}Fe_{0.6}$, $Au_{0.3}Rho_{0.1}Fe_{0.6}$, $Au_{0.1}Rh_{0.3}Fe_{0.6}$, $Au_{0.25}Rh_{0.25}Fe_{0.5}$ (i.e., $AuRhFe_2$), $Au_{0.4}Rh_{0.1}Fe_{0.5}$, $Au_{0.1}Rh_{0.4}Fe_{0.5}$, $Au_{0.3}Rh_{0.3}Fe_{0.4}$, $Au_{0.4}Rh_{0.2}Fe_{0.4}$, $Au_{0.2}Rh_{0.4}Fe_{0.4}$, $Au_{0.33}Rh_{0.33}Fe_{0.33}$ (i.e., AuRhFe), $Au_{0.3}Rh_{0.4}Fe_{0.3}$, $Au_{0.5}Rh_{0.2}Fe_{0.3}$, $Au_{0.2}Rh_{0.5}Fe_{0.3}$, $Au_{0.6}Rh_{0.1}Fe_{0.3}$, $Au_{0.1}Rh_{0.6}Fe_{0.3}$, $Au_{0.4}Rh_{0.4}Fe_{0.2}$, $Au_{0.6}Rh_{0.2}Fe_{0.2}$, $Au_{0.2}Rh_{0.6}Fe_{0.2}$, $Au_{0.45}Rh_{0.45}Fe_{0.1}$, $Au_{0.6}Rh_{0.3}Fe_{0.1}$, $Au_{0.3}Rh_{0.6}Fe_{0.1}$, $Au_{0.8}Rh_{0.1}Fe_{0.1}$, and $Au_{0.1}Rh_{0.8}Fe_{0.1}$.

Some examples of gold-ruthenium-nickel ternary alloy compositions suitable for the metal alloy core include the approximate molar compositions $Au_{0.025}Ru_{0.025}Ni_{0.95}$, $Au_{0.05}Ru_{0.05}Ni_{0.9}$, $Au_{0.1}Ru_{0.1}Ni_{0.8}$, $Au_{0.1}Ru_{0.2}Ni_{0.7}$, $Au_{0.2}Ru_{0.1}Ni_{0.7}$, $Au_{0.2}Ru_{0.2}Ni_{0.6}$, $Au_{0.3}Ru_{0.1}Ni_{0.6}$, $Au_{0.1}Ru_{0.3}Ni_{0.6}$, $Au_{0.25}Ru_{0.25}Ni_{0.5}$ (i.e., $AuRuNi_2$), $Au_{0.4}Ru_{0.1}Ni_{0.5}$, $Au_{0.1}Ru_{0.4}Ni_{0.5}$, $Au_{0.3}Ru_{0.3}Ni_{0.4}$, $Au_{0.4}Ru_{0.2}Ni_{0.4}$, $Au_{0.2}Ru_{0.4}Ni_{0.4}$, $Au_{0.33}Ru_{0.33}Ni_{0.33}$ (i.e., AuRuNi), $Au_{0.3}Ru_{0.4}Ni_{0.3}$, $Au_{0.5}Ru_{0.2}Ni_{0.3}$, $Au_{0.2}Ru_{0.5}Ni_{0.3}$, $Au_{0.6}Ru_{0.1}Ni_{0.3}$, $Au_{0.1}Ru_{0.6}Ni_{0.3}$, $Au_{0.4}Ru_{0.4}Ni_{0.2}$, $Au_{0.6}Ru_{0.2Ni0.2}$, $Au_{0.2}Ru_{0.6}Ni_{0.2}$, $Au_{0.45}Ru_{0.45}Ni_{0.1}$, $Au_{0.6Ru0.3}Ni_{0.1}$, $Au_{0.3}Ru_{0.6}Ni_{0.1}$, $Au_{0.8}Ru_{0.1}Ni_{0.1}$, and $Au_{0.1}Ru_{0.8}Ni_{0.1}$.

Some examples of gold-ruthenium-cobalt ternary alloy compositions suitable for the metal alloy core include the approximate molar compositions $Au_{0.025}Ru_{0.025}Co_{0.95}$, $Au_{0.05}Ru_{0.05}Co_{0.9}$, $Au_{0.1}Ru_{0.1}Co_{0.8}$, $Au_{0.1}Ru_{0.2}Co_{0.7}$, $Au_{0.2}Ru_{0.1}Co_{0.7}$, $Au_{0.2}Ru_{0.2}Co_{0.6}$, $Au_{0.3}Ru_{0.1}Co_{0.6}$, $Au_{0.1}Ru_{0.3}Co_{0.6}$, $Au_{0.25}Ru_{0.25}Co_{0.5}$ (i.e., $AuRuCo_2$), $Au_{0.4}Ru_{0.1}Co_{0.5}$, $Au_{0.1}Ru_{0.4}Co_{0.5}$, $Au_{0.3}Ru_{0.3}Co_{0.4}$, $Au_{0.4}Ru_{0.2}Co_{0.4}$, $Au_{0.2}Ru_{0.4}Co_{0.4}$, $Au_{0.33}Ru_{0.33}Co_{0.33}$ (i.e., AuRuCo), $Au_{0.3}Ru_{0.4}Co_{0.3}$, $Au_{0.5}Ru_{0.2}Co_{0.3}$, $Au_{0.2}Ru_{0.5}Co_{0.3}$, $Au_{0.6}Ru_{0.1}Co_{0.3}$, $Au_{0.1}Ru_{0.6}Co_{0.3}$, $Au_{0.4}Ru_{0.4}Co_{0.2}$, $Au_{0.6}Ru_{0.2}Co_{0.2}$, $Au_{0.2}Ru_{0.6}Co_{0.2}$, $Au_{0.45}Ru_{0.45}Co_{0.1}$, $Au_{0.6}Ru_{0.3Co0.1}$, $Au_{0.3}Ru_{0.6}Co_{0.1}$, $Au_{0.8}Ru_{0.1}Co_{0.1}$, and $Au_{0.1}Ru_{0.8}Co_{0.1}$.

Some examples of gold-ruthenium-iron ternary alloy compositions suitable for the metal alloy core include the approximate molar compositions $Au_{0.025}Ru_{0.025}Fe_{0.95}$, $Au_{0.05}Ru_{0.05}Fe_{0.9}$, $Au_{0.1}Ru_{0.1}Fe_{0.8}$, $Au_{0.1}Ru_{0.2}Fe_{0.7}$, $Au_{0.2}Ru_{0.1}Fe_{0.7}$, $Au_{0.2}Ru_{0.2}Fe_{0.6}$, $Au_{0.3}Ru_{0.1}Fe_{0.6}$, $Au_{0.1}Ru_{0.3}Fe_{0.6}$, $Au_{0.25}Ru_{0.25}Fe_{0.5}$ (i.e., $AuRuFe_2$), $Au_{0.4}Ru_{0.1}Fe_{0.5}$, $Au_{0.1}Ru_{0.4}Fe_{0.5}$, $Au_{0.3}Ru_{0.3}Fe_{0.4}$, $Au_{0.4}Ru_{0.2}Fe_{0.4}$, $Au_{0.2}Ru_{0.4Fe0.4}$, $Au_{0.33}Ru_{0.33}Fe_{0.33}$ (i.e., AuRuFe), $Au_{0.3}Ru_{0.4}Fe_{0.3}$, $Au_{0.5}Ru_{0.2}Fe_{0.3}$, $Au_{0.2}Ru_{0.5}Fe_{0.3}$, $Au_{0.6}Ru_{0.1}Fe_{0.3}$, $Au_{0.1}Ru_{0.6}Fe_{0.3}$, $Au_{0.4}Ru_{0.4}Fe_{0.2}$, $Au_{0.6}Ru_{0.2}Fe_{0.2}$, $Au_{0.2}Ru_{0.6Fe0.2}$, $Au_{0.45}Ru_{0.45}Fe_{0.1}$, $Au_{0.6}Ru_{0.3}Fe_{0.1}$, $Au_{0.3}Ru_{0.6}Fe_{0.1}$, $Au_{0.8}Ru_{0.1}Fe_{0.1}$, and $Au_{0.1}Ru_{0.8}Fe_{0.1}$.

In another embodiment, the metal alloy core is in the form of a ternary alloy composition having one second row transition metal and two first row transition metals. Some examples of classes of such ternary alloy compositions suitable for the metal alloy core include the ruthenium-nickel-cobalt, ruthenium-nickel-iron, ruthenium-cobalt-iron, rhodium-nickel-cobalt, rhodium-nickel-iron, and rhodium-cobalt-iron classes of ternary alloy compositions.

Some examples of ruthenium-nickel-cobalt-ternary alloy compositions suitable for the metal alloy core include the approximate molar compositions $Ru_{0.025}Ni_{0.025}Co_{0.95}$, $Ru_{0.05}Ni_{0.05}Co_{0.9}$, $Ru_{0.1}Ni_{0.1}Co_{0.8}$, $Ru_{0.1}Ni_{0.2}Co_{0.7}$, $Ru_{0.2}Ni_{0.1}Co_{0.7}$, $Ru_{0.2}Ni_{0.2}Co_{0.6}$, $Ru_{0.3}Ni_{0.1}Co_{0.6}$, $Ru_{0.1}Ni_{0.3}Co_{0.6}$, $Ru_{0.25}Ni_{0.25}Co_{0.5}$ (i.e., $RuNiCo_2$), $Ru_{0.4}Ni_{0.1}Co_{0.5}$, $Ru_{0.1}Ni_{0.4}Co_{0.5}$, $Ru_{0.3}Ni_{0.3}Co_{0.4}$, $Ru_{0.4}Ni_{0.2}Co_{0.4}$, $Ru_{0.2}Ni_{0.4}Co_{0.4}$, $Ru_{0.33}Ni_{0.33}Co_{0.33}$ (i.e., RuNiCo), $Ru_{0.3}Ni_{0.4}Co_{0.3}$, $Ru_{0.5}Ni_{0.2}Co_{0.3}$, $Ru_{0.2}Ni_{0.5}Co_{0.3}$, $Ru_{0.6}Ni_{0.1}Co_{0.3}$, $Ru_{0.1}Ni_{0.6}Co_{0.3}$, $Ru_{0.4}Ni_{0.4}Co_{0.2}$, $Ru_{0.6}Ni_{0.2}Co_{0.2}$, $Ru_{0.2}Ni_{0.6}Co_{0.2}$, $Ru_{0.45}Ni_{0.45}Co_{0.1}$, $Ru_{0.6}Ni_{0.3}Co_{0.1}$, $Ru_{0.3}Ni_{0.6}Co_{0.1}$, $Ru_{0.8}Ni_{0.1}Co_{0.1}$, and $Ru_{0.1}Ni_{0.8}Co_{0.1}$.

Some examples of ruthenium-nickel-iron ternary alloy compositions suitable for the metal alloy core include the approximate molar compositions $Ru_{0.025}Ni_{0.025}Fe_{0.95}$, $Ru_{0.05}Ni_{0.05}Fe_{0.9}$, $Ru_{0.1}Ni_{0.1}Fe_{0.8}$, $Ru_{0.1}Ni_{0.2}Fe_{0.7}$, $Ru_{0.2}Ni_{0.1}Fe_{0.7}$, $Ru_{0.2}Ni_{0.2}Fe_{0.6}$, $Ru_{0.3}N_{0.1}Fe_{0.6}$, $Ru_{0.1}Ni_{0.3}Fe_{0.6}$, $Ru_{0.25}Ni_{0.25}Fe_{0.5}$ (i.e., $RuNiFe_2$), $Ru_{0.4}Ni_{0.1}Fe_{0.5}$, $Ru_{0.1}Ni_{0.4}Fe_{0.5}$, $Ru_{0.3}Ni_{0.3}Fe_{0.4}$, $Ru_{0.4}Ni_{0.2}Fe_{0.4}$, $Ru_{0.2}Ni_{0.4}Fe_{0.4}$, $Ru_{0.33}Ni_{0.33}Fe_{0.33}$ (i.e., RuNiFe), $Ru_{0.3}Ni_{0.4}Fe_{0.3}$, $Ru_{0.5}Ni_{0.2}Fe_{0.3}$, $Ru_{0.2}Ni_{0.5}Fe_{0.3}$, $Ru_{0.6}Ni_{0.1}Fe_{0.3}$, $Ru_{0.1}Ni_{0.6}Fe_{0.3}$, $Ru_{0.4}Ni_{0.4}Fe_{0.2}$, $Ru_{0.6}Ni_{0.2}Fe_{0.2}$, $Ru_{0.2}Ni_{0.6}Fe_{0.2}$, $Ru_{0.45}Ni_{0.45}Fe_{0.1}$, $Ru_{0.6}Ni_{0.3}Fe_{0.1}$, $Ru_{0.3}Ni_{0.6}Fe_{0.1}$, $Ru_{0.8}Ni_{0.1}Fe_{0.1}$, and $Ru_{0.1}Ni_{0.8}Fe_{0.1}$.

Some examples of ruthenium-cobalt-iron ternary alloy compositions suitable for the metal alloy core include the approximate molar compositions $Ru_{0.025}Co_{0.025}Fe_{0.95}$, $Ru_{0.05}Co_{0.05}Fe_{0.9}$, $Ru_{0.1}Co_{0.1}Fe_{0.8}$, $Ru_{0.1}Co_{0.2}Fe_{0.7}$, $Ru_{0.2}Co_{0.1}Fe_{0.7}$, $Ru_{0.2}Co_{0.2}Fe_{0.6}$, $Ru_{0.3}Co_{0.1}Fe_{0.6}$, $Ru_{0.1}Co_{0.3}Fe_{0.6}$, $Ru_{0.25}Co_{0.25}Fe_{0.5}$ (i.e., $RuCoFe_2$), $Ru_{0.4}Co_{0.1}Fe_{0.5}$, $Ru_{0.1}Co_{0.4}Fe_{0.5}$, $Ru_{0.3}Co_{0.3}Fe_{0.4}$, $Ru_{0.4}Co_{0.2}Fe_{0.4}$, $Ru_{0.2}Co_{0.4}Fe_{0.4}$, $Ru_{0.33}Co_{0.33}Fe_{0.33}$ (i.e., RuCoFe), $Ru_{0.3}Co_{0.4}Fe_{0.3}$, $Ru_{0.5}Co_{0.2}Fe_{0.3}$, $Ru_{0.2}Co_{0.5}Fe_{0.3}$, $Ru_{0.6}Co_{0.1}Fe_{0.3}$, $Ru_{0.1}Co_{0.6}Fe_{0.3}$, $Ru_{0.4}Co_{0.4}Fe_{0.2}$, $Ru_{0.6}Co_{0.2}Fe_{0.2}$, $Ru_{0.2}Co_{0.6}Fe_{0.2}$, $Ru_{0.45}Co_{0.45}Fe_{0.1}$, $Ru_{0.6}Co_{0.3}Fe_{0.1}$, $Ru_{0.3}Co_{0.6}Fe_{0.1}$, $Ru_{0.8}Co_{0.1}Fe_{0.1}$, and $Ru_{0.1}Co_{0.8}Fe_{0.1}$.

Some examples of rhodium-nickel-cobalt ternary alloy compositions suitable for the metal alloy core include the approximate molar compositions $Rh_{0.025}Ni_{0.025}Co_{0.95}$, $Rh_{0.05}Ni_{0.05}Co_{0.9}$, $Rh_{0.1}Ni_{0.1}Co_{0.8}$, $Rh_{0.1}Ni_{0.2}Co_{0.7}$, $Rh_{0.2}Ni_{0.1}Co_{0.7}$, $Rh_{0.2}Ni_{0.2}Co_{0.6}$, $Rh_{0.3}Ni_{0.1}Co_{0.6}$, $Rh_{0.1}Ni_{0.3}Co_{0.6}$, $Rh_{0.25}Ni_{0.25}Co_{0.5}$ (i.e., $RhNiCo_2$), $Rh_{0.4}Ni_{0.1}Co_{0.5}$, $Rh_{0.1}Ni_{0.4}Co_{0.5}$, $Rh_{0.3}Ni_{0.3}Co_{0.4}$, $Rh_{0.4}Ni_{0.2}Co_{0.4}$, $Rh_{0.2}Ni_{0.4}Co_{0.4}$, $Rh_{0.33}Ni_{0.33}Co_{0.33}$ (i.e., RhNiCo), $Rh_{0.3}Ni_{0.4}Co_{0.3}$, $Rh_{0.5}Ni_{0.2}Co_{0.3}$, $Rh_{0.2}Ni_{0.5}Co_{0.3}$, $Rh_{0.6}Ni_{0.1}Co_{0.3}$, $Rh_{0.1}Ni_{0.6}Co_{0.3}$, $Rh_{0.4}Ni_{0.4}Co_{0.2}$, $Rh_{0.6}Ni_{0.2}Co_{0.2}$, $Rh_{0.2}Ni_{0.6}Co_{0.2}$, $Rh_{0.45}Ni_{0.45}Co_{0.1}$, $Rh_{0.6}Ni_{0.3}Co_{0.1}$, $Rh_{0.3}Ni_{0.6}Co_{0.1}$, $Rh_{0.8}Ni_{0.1}Co_{0.1}$, and $Rh_{0.1}Ni_{0.8}Co_{0.1}$.

Some examples of rhodium-nickel-iron ternary alloy compositions suitable for the metal alloy core include the approximate molar compositions $Rh_{0.025}Ni_{0.025}Fe_{0.95}$, $Rh_{0.05}Ni_{0.05}Fe_{0.9}$, $Rh_{0.1}Ni_{0.1}Fe_{0.8}$, $Rh_{0.1}Ni_{0.2}Fe_{0.7}$, $Rh_{0.2}Ni_{0.1}Fe_{0.7}$, $Rh_{0.2}Ni_{0.2}Fe_{0.6}$, $Rh_{0.3}Ni_{0.1}Fe_{0.6}$, $Rh_{0.1}Ni_{0.3}Fe_{0.6}$, $Rh_{0.25}Ni_{0.25}Fe_{0.5}$ (i.e., $RhNiFe_2$), $Rh_{0.4}Ni_{0.1}Fe_{0.5}$, $Rh_{0.1}Ni_{0.4}Fe_{0.5}$, $Rh_{0.3}Ni_{0.3}Fe_{0.4}$, $Rh_{0.4}Ni_{0.2}Fe_{0.4}$, $Rh_{0.2}Ni_{0.4}Fe_{0.4}$, $Rh_{0.33}Ni_{0.33}Fe_{0.33}$ (i.e., RhNiFe), $Rh_{0.3}Ni_{0.4}Fe_{0.3}$, $Rh_{0.5}Ni_{0.2}Fe_{0.3}$, $Rh_{0.2}Ni_{0.5}Fe_{0.3}$, $Rh_{0.6}Ni_{0.1}Fe_{0.3}$, $Rh_{0.1}Ni_{0.6}Fe_{0.3}$, $Rh_{0.4}Ni_{0.4}Fe_{0.2}$, $Rh_{0.6}Ni_{0.2}Fe_{0.2}$, $Rh_{0.2}Ni_{0.6}Fe_{0.2}$, $Rh_{0.45}Ni_{0.45}Fe_{0.1}$, $Rh_{0.6}Ni_{0.3}Fe_{0.1}$, $Rh_{0.3}Ni_{0.6}Fe_{0.1}$, $Rh_{0.8}Ni_{0.1}Fe_{0.1}$, and $Rh_{0.1}Ni_{0.8}Fe_{0.1}$.

Some examples of rhodium-cobalt-iron ternary alloy compositions suitable for the metal alloy core include the approximate molar compositions $Rh_{0.025}Co_{0.025}Fe_{0.95}$, $Rh_{0.05}Co_{0.05}Fe_{0.9}$, $Rh_{0.1}Co_{0.1}Fe_{0.8}$, $Rh_{0.1}Co_{0.2}Fe_{0.7}$, $Rh_{0.2}Co_{0.1}Fe_{0.7}$, $Rh_{0.2}Co_{0.2}Fe_{0.6}$, $Rh_{0.3}Co_{0.1}Fe_{0.6}$, $Rh_{0.1}Co_{0.3}Fe_{0.6}$, $Rh_{0.25}Co_{0.25}Fe_{0.5}$ (i.e., $RhCoFe_2$), $Rh_{0.4}Co_{0.1}Fe_{0.5}$, $Rh_{0.1}Co_{0.4}Fe_{0.5}$, $Rh_{0.3}Co_{0.3}Fe_{0.4}$, $Rh_{0.4}Co_{0.2}Fe_{0.4}$, $Rh_{0.2}Co_{0.4}Fe_{0.4}$, $Rh_{0.33}Co_{0.33}Fe_{0.33}$ (i.e., RhCoFe), $Rh_{0.3}Co_{0.4}Fe_{0.3}$, $Rh_{0.5}Co_{0.2}Fe_{0.3}$, $Rh_{0.2}Co_{0.5}Fe_{0.3}$, $Rh_{0.6}Co_{0.1}Fe_{0.3}$, $Rh_{0.1}Co_{0.6}Fe_{0.3}$, $Rh_{0.4}Co_{0.4}Fe_{0.2}$, $Rh_{0.6}Co_{0.2}Fe_{0.2}$, $Rh_{0.2}Co_{0.6}Fe_{0.2}$, $Rh_{0.45}Co_{0.45}Fe_{0.1}$, $Rh_{0.6}Co_{0.3}Fe_{0.1}$, $Rh_{0.3}Co_{0.6}Fe_{0.1}$, $Rh_{0.8}Co_{0.1}Fe_{0.1}$, and $Rh_{0.1}Co_{0.8}Fe_{0.1}$.

In another embodiment, the metal alloy core is in the form of a ternary alloy composition having one third row transition metal and two first row transition metals. Some examples of classes of such ternary alloy compositions suitable for the metal alloy core include the gold-nickel-cobalt, gold-nickel-iron, gold-cobalt-iron, rhenium-nickel-cobalt, rhenium-nickel-iron, rhenium-cobalt-iron, iridium-nickel-cobalt, iridium-nickel-iron, iridium-cobalt-iron, osmium-nickel-cobalt, osmium-nickel-iron, and osmium-cobalt-iron classes of ternary alloy compositions.

Some examples of gold-nickel-cobalt ternary alloy compositions suitable for the metal alloy core include the approximate molar compositions $Au_{0.025}Ni_{0.025}Co_{0.95}$, $Au_{0.05}Ni_{0.05}Co_{0.9}$, $Au_{0.1}Ni_{0.1}Co_{0.8}$, $Au_{0.1}Ni_{0.2}Co_{0.7}$, $Au_{0.2}Ni_{0.1}Co_{0.7}$, $Au_{0.2}Ni_{0.2}Co_{0.6}$, $Au_{0.3}Ni_{0.1}Co_{0.6}$, $Au_{0.1}Ni_{0.3}Co_{0.6}$, $Au_{0.25}Ni_{0.25}Co_{0.5}$ (i.e., $AuNiCo_2$), $Au_{0.4}Ni_{0.1}Co_{0.5}$, $Au_{0.1}Ni_{0.4}Co_{0.5}$, $Au_{0.3}Ni_{0.3}Co_{0.4}$, $Au_{0.4}Ni_{0.2}Co_{0.4}$, $Au_{0.2}Ni_{0.4}Co_{0.4}$, $Au_{0.33}Ni_{0.33}Co_{0.33}$ (i.e., AuNiCo), $Au_{0.3}Ni_{0.4}Co_{0.3}$, $Au_{0.5}Ni_{0.2}Co_{0.3}$, $Au_{0.2}Ni_{0.5}Co_{0.3}$, $Au_{0.6}Ni_{0.1}Co_{0.3}$, $Au_{0.1}Ni_{0.6}Co_{0.3}$, $Au_{0.4}Ni_{0.4}Co_{0.2}$, $Au_{0.6}Ni_{0.2}Co_{0.2}$, $Au_{0.2}Ni_{0.6}Co_{0.2}$, $Au_{0.45}Ni_{0.45}Co_{0.1}$, $Au_{0.6}Ni_{0.3}Co_{0.1}$, $Au_{0.3}Ni_{0.6}Co_{0.1}$, $Au_{0.8}Ni_{0.1}Co_{0.1}$, and $Au_{0.1}Ni_{0.8}Co_{0.1}$.

Some examples of gold-nickel-iron ternary alloy compositions suitable for the metal alloy core include the approximate molar compositions $Au_{0.025}Ni_{0.025}Fe_{0.95}$, $Au_{0.05}Ni_{0.05}Fe_{0.9}$, $Au_{0.1}Ni_{0.1}Fe_{0.8}$, $Au_{0.1}Ni_{0.2}Fe_{0.7}$, $Au_{0.2}Ni_{0.1}Fe_{0.7}$, $Au_{0.2}Ni_{0.2}Fe_{0.6}$, $Au_{0.3}Ni_{0.1}Fe_{0.6}$, $Au_{0.1}Ni_{0.3}Fe_{0.6}$, $Au_{0.25}Ni_{0.25}Fe_{0.5}$ (i.e., $AuNiFe_2$), $Au_{0.4}Ni_{0.1}Fe_{0.5}$, $Au_{0.1}Ni_{0.4}Fe_{0.5}$, $Au_{0.3}Ni_{0.3}Fe_{0.4}$, $Au_{0.4}Ni_{0.2}Fe_{0.4}$, $Au_{0.2}Ni_{0.4}Fe_{0.4}$, $Au_{0.33}Ni_{0.33}Fe_{0.33}$ (i.e., AuNiFe), $Au_{0.3}Ni_{0.4}Fe_{0.3}$, $Au_{0.5}Ni_{0.2}Fe_{0.3}$, $Au_{0.2}Ni_{0.5}Fe_{0.3}$, $Au_{0.6}Ni_{0.1}Fe_{0.3}$, $Au_{0.1}Ni_{0.6}Fe_{0.3}$, $Au_{0.4}Ni_{0.4}Fe_{0.2}$, $Au_{0.6}Ni_{0.2}Fe_{0.2}$, $Au_{0.2}Ni_{0.6}Fe_{0.2}$, $Au_{0.45}Ni_{0.45}Fe_{0.1}$, $Au_{0.6}Ni_{0.3}Fe_{0.1}$, $Au_{0.3}Ni_{0.6}Fe_{0.1}$, $Au_{0.8}Ni_{0.1}Fe_{0.1}$, and $Au_{0.1}Ni_{0.8}Fe_{0.1}$.

Some examples of gold-cobalt-iron ternary alloy compositions suitable for the metal alloy core include the approximate molar compositions $Au_{0.025}Co_{0.025}Fe_{0.95}$, $Au_{0.05}Co_{0.05}Fe_{0.9}$, $Au_{0.1}Co_{0.1}Fe_{0.8}$, $Au_{0.1}Co_{0.2}Fe_{0.7}$, $Au_{0.2}Co_{0.1}Fe_{0.7}$, $Au_{0.2}Co_{0.2}Fe_{0.6}$, $Au_{0.3}Co_{0.1}Fe_{0.6}$, $Au_{0.1}Co_{0.3}Fe_{0.6}$, $Au_{0.25}Co_{0.25}Fe_{0.5}$ (i.e., $AuCoFe_2$), $Au_{0.4}Co_{0.1}Fe_{0.5}$, $Au_{0.1}Co_{0.4}Fe_{0.5}$, $Au_{0.3}Co_{0.3}Fe_{0.4}$, $Au_{0.4}Co_{0.2}Fe_{0.4}$, $Au_{0.2}Co_{0.4}Fe_{0.4}$, $Au_{0.33}Co_{0.33}Fe_{0.33}$ (i.e., AuCoFe), $Au_{0.3}Co_{0.4}Fe_{0.3}$, $Au_{0.5}Co_{0.2}Fe_{0.3}$, $Au_{0.2}Co_{0.5}Fe_{0.3}$, $Au_{0.6}Co_{0.1}Fe_{0.3}$, $Au_{0.1}Co_{0.6}Fe_{0.3}$, $Au_{0.4}Co_{0.4}Fe_{0.2}$, $Au_{0.6}Co_{0.2}Fe_{0.2}$, $Au_{0.2}Co_{0.6}Fe_{0.2}$, $Au_{0.45}Co_{0.45}Fe_{0.1}$, $Au_{0.6}Co_{0.3}Fe_{0.1}$, $Au_{0.3}Co_{0.6}Fe_{0.1}$, $Au_{0.8}Co_{0.1}Fe_{0.1}$, and $Au_{0.1}Co_{0.8}Fe_{0.1}$.

Some examples of rhenium-nickel-cobalt ternary alloy compositions suitable for the metal alloy core include the approximate molar compositions $Re_{0.025}Ni_{0.025}Co_{0.95}$, $Re_{0.05}Ni_{0.05}Co_{0.9}$, $Re_{0.1}Ni_{0.1}Co_{0.8}$, $Re_{0.1}Ni_{0.2}Co_{0.7}$, $Re_{0.2}Ni_{0.1}Co_{0.7}$, $Re_{0.2}Ni_{0.2}Co_{0.6}$, $Re_{0.3}Ni_{0.1}Co_{0.6}$, $Re_{0.1}Ni_{0.3}Co_{0.6}$, $Re_{0.25}Ni_{0.25}Co_{0.5}$ (i.e., $ReNiCo_2$), $Re_{0.4}Ni_{0.1}Co_{0.5}$, $Re_{0.1}Ni_{0.4}Co_{0.5}$, $Re_{0.3}Ni_{0.3}Co_{0.4}$, $Re_{0.4}Ni_{0.2}Co_{0.4}$, $Re_{0.2}Ni_{0.4}Co_{0.4}$, $Re_{0.33}Ni_{0.33}Co_{0.33}$ (i.e., ReNiCo), $Re_{0.3}Ni_{0.4}Co_{0.3}$, $Re_{0.5}Ni_{0.2}Co_{0.3}$, $Re_{0.2}Ni_{0.5}Co_{0.3}$, $Re_{0.6}Ni_{0.1}Co_{0.3}$, $Re_{0.1}Ni_{0.6}Co_{0.3}$, $Re_{0.4}Ni_{0.4}Co_{0.2}$, $Re_{0.6}Ni_{0.2}Co_{0.2}$, $Re_{0.2}Ni_{0.6}Co_{0.2}$, $Re_{0.45}Ni_{0.45}Co_{0.1}$, $Re_{0.6}Ni_{0.3}Co_{0.1}$, $Re_{0.3}Ni_{0.6}Co_{0.1}$, $Re_{0.8}Ni_{0.1}Co_{0.1}$, and $Re_{0.1}Ni_{0.8}Co_{0.1}$.

Some examples of rhenium-nickel-iron ternary alloy compositions suitable for the metal alloy core include the approximate molar compositions $Re_{0.025}Ni_{0.025}Fe_{0.95}$, $Re_{0.05}Ni_{0.05}Fe_{0.9}$, $Re_{0.1}Ni_{0.1}Fe_{0.8}$, $Re_{0.1}Ni_{0.2}Fe_{0.7}$, $Re_{0.2}Ni_{0.1}Fe_{0.7}$, $Re_{0.2}Ni_{0.2}Fe_{0.6}$, $Re_{0.3}Ni_{0.1}Fe_{0.6}$, $Re_{0.1}Ni_{0.3}Fe_{0.6}$, $Re_{0.25}Ni_{0.25}Fe_{0.5}$ (i.e., $ReNiFe_2$), $Re_{0.4}Ni_{0.1}Fe_{0.5}$, $Re_{0.1}Ni_{0.4}Fe_{0.5}$, $Re_{0.3}Ni_{0.3}Fe_{0.4}$, $Re_{0.4}Ni_{0.2}Fe_{0.4}$, $Re_{0.2}Ni_{0.4}Fe_{0.4}$, $Re_{0.33}Ni_{0.33}Fe_{0.33}$ (i.e., ReNiFe), $Re_{0.3}Ni_{0.4}Fe_{0.3}$, $Re_{0.5}Ni_{0.2}Fe_{0.3}$, $Re_{0.2}Ni_{0.5}Fe_{0.3}$, $Re_{0.6}Ni_{0.1}Fe_{0.3}$, $Re_{0.1}Ni_{0.6}Fe_{0.3}$, $Re_{0.4}Ni_{0.4}Fe_{0.2}$, $Re_{0.6}Ni_{0.2}Fe_{0.2}$, $Re_{0.2}Ni_{0.6}Fe_{0.2}$, $Re_{0.45}Ni_{0.45}Fe_{0.1}$, $Re_{0.6}Ni_{0.3}Fe_{0.1}$, $Re_{0.3}Ni_{0.6}Fe_{0.1}$, $Re_{0.8}Ni_{0.1}Fe_{0.1}$, and $Re_{0.1}Ni_{0.8}Fe_{0.1}$.

Some examples of rhenium-cobalt-iron ternary alloy compositions suitable for the metal alloy core include the approximate molar compositions $Re_{0.025}Co_{0.025}Fe_{0.95}$, $Re_{0.05}Co_{0.05}Fe_{0.9}$, $Re_{0.1}Co_{0.1}Fe_{0.8}$, $Re_{0.1}Co_{0.2}Fe_{0.7}$, $Re_{0.2}Co_{0.1}Fe_{0.7}$, $Re_{0.2}Co_{0.2}Fe_{0.6}$, $Re_{0.3}Co_{0.1}Fe_{0.6}$, $Re_{0.1}Co_{0.3}Fe_{0.6}$, $Re_{0.25}Co_{0.25}Fe_{0.5}$ (i.e., $ReCoFe_2$), $Re_{0.4}Co_{0.1}Fe_{0.5}$, $Re_{0.1}Co_{0.4}Fe_{0.5}$, $Re_{0.3}Co_{0.3}Fe_{0.4}$, $Re_{0.4}Co_{0.2}Fe_{0.4}$, $Re_{0.2}Co_{0.4}Fe_{0.4}$, $Re_{0.33}Co_{0.33}Fe_{0.33}$ (i.e., ReCoFe), $Re_{0.3}Co_{0.4}Fe_{0.3}$, $Re_{0.5}Co_{0.2}Fe_{0.3}$, $Re_{0.2}Co_{0.5}Fe_{0.3}$, $Re_{0.6}Co_{0.1}Fe_{0.3}$, $Re_{0.1}Co_{0.6}Fe_{0.3}$, $Re_{0.4}Co_{0.4}Fe_{0.2}$, $Re_{0.6}Co_{0.2}Fe_{0.2}$, $Re_{0.2}Co_{0.6}Fe_{0.2}$, $Re_{0.45}Co_{0.45}Fe_{0.1}$, $Re_{0.6}Co_{0.3}Fe_{0.1}$, $Re_{0.3}Co_{0.6}Fe_{0.1}$, $Re_{0.8}Co_{0.1}Fe_{0.1}$, and $Re_{0.1}Co_{0.8}Fe_{0.1}$.

In another embodiment, the metal alloy core is in the form of a quaternary alloy composition. The quaternary alloy composition can include, for example, three metals selected from the second row and/or third row transition metals in combination with one first row transition metal; or two metals selected from the second row and/or third row transition metals in combination with two first row transition metals; or one second row or third row transition metal in combination with three first row transition metals.

Such a quaternary alloy composition can be represented by the molar formula $M_{1-x-y-z}N_xP_yT_z$ (4) wherein one, two, or three of M, N, P, and T independently represent second row and/or third row transition metals and one, two, or three of M, N, P, and T independently represent first row transition metals. The values of x, y, and z are independently as described for x above under formula (2a). By the rules of chemistry, the sum of x, y, and z in formula (4) must be less than 1.

Some examples of classes of quaternary alloy compositions suitable for the metal alloy core having three metals selected from the second row and/or third row transition metals in combination with one first row transition metal include the gold-iridium-rhenium-nickel, gold-iridium-rhenium-cobalt, gold-iridium-rhenium-iron, iridium-osmium-rhenium-nickel, iridium-osmium-rhenium-cobalt, iridium-osmium-rhenium-iron, gold-ruthenium-rhenium-nickel, gold-ruthenium-rhenium-cobalt, gold-ruthenium-rhenium-iron, gold-iridium-ruthenium-nickel, gold-iridium-ruthenium-cobalt, gold-iridium-ruthenium-iron, gold-rhodium-rhenium-nickel, gold-rhodium-rhenium-cobalt, gold-rhodium-rhenium-iron, gold-rhodium-ruthenium-nickel, gold-rhodium-ruthenium-cobalt, gold-rhodium-ruthenium-iron, rhenium-rhodium-ruthenium-nickel, rhenium-rhodium-ruthenium-cobalt, and rhenium-rhodium-ruthenium-iron classes of quaternary alloy compositions.

Some examples of classes of quaternary alloy compositions suitable for the metal alloy core having two metals selected from the second row and/or third row transition metals in combination with two first row transition metals include the gold-rhenium-nickel-cobalt, gold-rhenium-nickel-iron, gold-rhenium-cobalt-iron, gold-iridium-nickel-cobalt, gold-iridium-nickel-iron, gold-iridium-cobalt-iron, gold-ruthenium-nickel-cobalt, gold-ruthenium-nickel-iron, gold-ruthenium-cobalt-iron, rhenium-ruthenium-nickel-cobalt, rhenium-ruthenium-nickel-iron, rhenium-ruthenium-cobalt-iron, iridium-ruthenium-nickel-cobalt, iridium-ruthenium-nickel-iron, iridium-ruthenium-cobalt-iron, rhodium-ruthenium-nickel-cobalt, rhodium-ruthenium-nickel-iron, and rhodium-ruthenium-cobalt-iron classes of quaternary alloy compositions.

Some examples of classes of quaternary alloy compositions suitable for the metal alloy core having one second row or third row transition metal in combination with three first row transition metals include the gold-nickel-cobalt-iron, rhenium-nickel-cobalt-iron, iridium-nickel-cobalt-iron, osmium-nickel-cobalt-iron, ruthenium-nickel-cobalt-iron, and rhodium-nickel-cobalt-iron classes of quaternary alloy compositions.

Any of the metal alloy cores described above can include one or more additional zerovalent or non-zerovalent metals, thereby resulting in higher alloys. Some additional metals which can be included in the metal alloy core include any one or more metals selected from the alkali, alkaline earth, main group, transition, lanthanide, and actinide classes of metals.

Some examples of alkali metals suitable for inclusion in the metal alloy core include lithium (Li), sodium (Na), potassium (K), and rubidium (Rb). Some examples of suitable alkaline earth metals include beryllium (Be), magnesium (Mg), calcium (Ca), strontium (Sr), and barium (Ba).

Some examples of main group metals suitable for inclusion in the metal alloy core include boron (B), aluminum (Al), gallium (Ga), indium (In), carbon (C), silicon (Si), germanium (Ge), nitrogen (N), phosphorus (P), arsenic (As), antimony (Sb), sulfur (S), selenium (Se), and tellurium (Te).

Some examples of lanthanide metals suitable for inclusion in the metal alloy core include lanthanum (La), cerium (Ce), neodymium (Nd), samarium (Sm), europium (Eu), gadolinium (Gd), and terbium (Th). Some examples of suitable actinide metals include thorium (Th), proctactinium (Pa), uranium (U), and americium (Am).

The metal alloy core can be in a homogeneous form. In a homogeneous form, the metal atoms in the metal alloy core are distributed uniformly on a molecular level throughout the core.

The metal alloy core can also be in a heterogeneous form. In a heterogeneous form, the metal atoms in the metal alloy core are distributed with varying composition, i.e., non-uniformly, in the core. For example, a heterogeneous metal alloy core can include individual grains, regions, or crystallites composed of one metal intermingled with individual grains, regions, or crystallites of another metal throughout the core.

Another example of a heterogeneous metal alloy core is one having an inner subcore (i.e., subcore) of one or a combination of any of the metals described above, the subcore at least partially encapsulated by an outer shell of any of the metals described above. The outer shell is covered by the atomically thin layer of platinum atoms, at least a portion of which are zerovalent.

In a preferred embodiment, the core is a heterogeneous metal alloy core composed of an inner subcore of one or a combination of zerovalent first row transition metals at least partially encapsulated by an outer shell composed of one or a combination of zerovalent or charged second row and/or third row transition metal atoms.

More preferably, the outer shell is composed of one or a combination of second row and/or third row transition metals which are noble. Some examples of suitable noble second row or third row transition metals include gold, rhenium, rhodium, ruthenium, and iridium.

The second row and/or third row transition metals in the outer shell can be in a zerovalent form, a partially oxidized form, or in a completely oxidized form, i.e., as an oxide. The oxidized form can be in the form of a continuous network, or alternatively, individual or aggregated molecular species or complexes of the second row and/or third row transition metal.

An oxidized shell includes the second row and/or third row transition metal atoms linked by main group elements. Some examples of second row and third row transition metal oxidized networks include the oxides, sulfides, selenides, tellurides, nitrides, phosphides, arsenides, carbides, silicides, borides, and aluminides of these metals.

Particularly preferred are outer shell layers having an oxide composition of the second row and/or third row transition metals. More preferably, the outer shell oxide layers are oxides of rhenium, rhodium, ruthenium, iridium, or combinations thereof. Such outer shell oxide layers tend to suppress formation of hydroxyl groups on platinum.

As discussed earlier, such outer shell oxides, particularly of Re, Ru, and Ir, tend to form by oxidation of the corresponding metal by the oxidizing potentials of a fuel cell cathode. These oxide compositions tend to have hydroxyl groups on the surface.

More preferably, the outer shell layers are atomically thin. The thickness of the atomically thin outer shell of second row or third row transition metal is preferably an atomic submonolayer, monolayer, bilayer, or any combination thereof. Even more preferably, the outer shell is an atomic monolayer.

The inner subcore-outer shell type of core described above is particularly preferred when the platinum-coated particles are subjected to acidic conditions and/or oxidizing potentials. Such conditions are typical for most fuel cells, particularly in the cathodes of fuel cells. In such conditions, an outer shell of the second row and third row transition metal shields the reactive first row transition metal subcore from the corrosive environment and from oxidation. The outer shell also prevents the reactive first row metal subcore from diffusing to the surface and being dissolved. Accordingly, the benefits of the first row metal subcore, e.g., cheap replacement of more expensive metals as well as possible catalytic enhancements of surface platinum by electronic effects, can be realized while not compromising the catalyst.

In a particularly preferred embodiment, the metal alloy core is composed of a subcore of zerovalent nickel, cobalt, or iron at least partially encapsulated by an atomically thin outer shell composed of one or a combination of zerovalent or charged noble metal atoms selected from gold, rhodium, iridium, ruthenium, and rhenium.

A particularly preferred metal alloy core is one having a subcore of zerovalent nickel encapsulated by an atomically thin outer shell of zerovalent or charged gold atoms. The atomically thin outer shell of gold is covered by an atomically thin layer of platinum atoms, at least a portion of which are in a zerovalent oxidation state.

The heterogeneous metal alloy cores described above can include one or more additional shells, i.e., one or more subshells, between the inner subcore and the outer shell. For example, a nickel subcore can be encapsulated by a subshell of gold, and the subshell of gold encapsulated by an outer shell of rhenium, or vice-versa. Another example is a nickel subcore encapsulated by a subshell of ruthenium, the subshell of ruthenium encapsulated by a subshell of gold, and the subshell of gold encapsulated by an outer shell of rhenium. The outer shell of rhenium is at least partially encapsulated by the atomically thin layer of platinum.

The metal alloy core can also have a combination of a homogeneous component and a heterogeneous component. For example, a core can have an inner subcore and an outer shell, each of which are homogeneous, but the core as a whole is heterogeneous. Another example of such a core is one containing a homogeneous phase of two or metals in combination with one or more homogeneous or heterogeneous interlayers of one or more other metals.

The platinum-coated particles described above can have any of several morphologies. For example, the particles can be approximately spherical, oblong, rectangular, square planar, trigonal bipyramidal, cylindrical, octahedral, cuboctahedral, icosahedral, rod-shaped, cuboidal, pyramidal, amorphous, and so on.

The platinum-coated particles described above can also be in any of several arrangements. The particles can be, for example, agglomerates, micelles, ordered arrays, a guest in a host such as a zeolite or patterned polymer, and so on.

The size of the platinum-coated particles is dependent upon the application, and is thus, not particularly limited. For example, in one embodiment, the size of the particles are a few nanometers to several hundred nanometers, i.e., nanoparticles. In another embodiment, the size of the particles range from hundreds of nanometers to tens or hundreds of microns, i.e., microparticles. In yet another embodiment, the size of the particles range from hundreds of microns to several millimeters in size.

For example, when the platinum-coated particles are applied as heterogeneous catalysts, the size of the particles can be anywhere from a few nanometers to several millimeters in size. When applied as catalysts, the minimum size of the particles is preferably 1 micron, more preferably 500 nanometers, more preferably 100 nanometers, and even more preferably 10 nanometers. The maximum size of the particles is preferably 1 millimeter, more preferably 500 microns, more preferably 100 microns, and even more preferably 10 microns.

When the platinum-coated particles of the invention are directed as oxygen reduction electrocatalysts, as in fuel cells, the particles are preferably nanoparticles. In addition, when used in fuel cells, the size of the nanoparticles is critical. For example, as the size of the nanoparticles decrease, the nanoparticles tend to become increasingly susceptible to oxidation; and as the size of the nanoparticles increase, the surface area of the nanoparticles decrease. The decrease in surface area causes a concomitant decrease in catalytic activity and efficiency.

The platinum-coated nanoparticles preferably have a minimum size of about 1 or 2 nanometers and more preferably 3, 4 or 5 nanometers. The platinum-coated nanoparticles preferably have a maximum size of about 500 nanometers, more preferably a maximum size of 100 nanometers, even more preferably a maximum size of about 50 nanometers, and most preferably a maximum size of about 10 nanometers. The maximum size of the platinum-coated nanoparticles is preferably no more than about 12 nanometers.

Accordingly, when applied to fuel cells, the platinum-coated nanoparticles have a size of about 3-10 nanometers, 4-10 nanometers, or 5-10 nanometers. The platinum-coated nanoparticles most preferably have a size of about 5 nanometers.

The platinum-coated particles can be approximately, or precisely, monodisperse in size. Alternatively, the particles can be anywhere from slightly to widely polydisperse in size.

The platinum-coated particles described above can be in any suitable form. For example, the platinum-coated particles can be in a solid form, such as a powder.

Alternatively, the platinum-coated particles can be suspended or dispersed in a liquid phase. The liquid phase can be any suitable liquid phase. For example, the liquid phase can be aqueous-based. The aqueous-based liquid phase can be completely water, or can include another suitable solvent. For example, the aqueous-based liquid phase can be a water-alcohol mixture.

Alternatively, the liquid phase can be, or include, an organic solvent. Some examples of suitable organic solvents include acetonitrile, dimethylsulfoxide, dimethylformamide, toluene, methylene chloride, chloroform, hexanes, glyme, diethyl ether, and the like.

The platinum-coated particles can also have on their surface some trace chemicals. Some examples of trace chemicals include oxides, halogens, carbon monoxide, charged species, and so on, as long as such trace chemicals do not obviate the intended use of the platinum-coated particles.

Preferably, when the platinum-metal oxide composite particles are applied in fuel cells, the surfaces of the particles are free of any surface agents including ligands, polymers, surfactants, and so on. However, for other applications, e.g., in catalysis or nanostructural engineering, a surface active agent may be useful. Such surface active agents can be, for example, suitable metal-bonding ligands or surfactants bound to, or associated with, the surface of the composite particles. Some examples of metal-bonding ligands include phosphines, amines, and thiols.

Some suitable subclasses of phosphine ligands include the trialkylphosphines, triphenylphosphines, diphosphines, and derivatives therefrom. Some specific examples of phosphine ligands include trimethylphosphine, triethylphosphine, triisopropylphosphine, triphenylphosphine, 1,2-bis-(diphenylphosphino)ethane, and derivatives therefrom.

Some suitable subclasses of amine ligands include the nitrogen-containing rings, trialkylamines, and the diamines. Some specific examples of amine ligands include pyridine, 2,2'-bipyridine, terpyridine (2,2';6'2"-terpyridine), piperidine, pyrrole, pyrazole, pyrrolidine, pyrimidine, imidazole, trimethylamine, triethylamine, triisopropylamine, ethylenediamine, and ethylenediaminetetraacetic acid (EDTA).

Some suitable subclasses of thiol ligands include the thiophenols, sulfur-containing rings, alkylmercaptans, sulfides, and disulfides. Some examples of alkylmercaptans include methanethiol, ethanethiol, 2-propanethiol, 2-methyl-2-propanethiol, octylthiol, decylthiol, dodecylthiol, methylsulfide, ethylsulfide, phenyldisulfide, thiophene, 2,2'-bithiophene, and tetrathiafulvalene.

Some examples of surfactants include the polyalkyleneoxides, polyvinylalcohols, polyvinylpyrrolidinones, siloxanes, albumin, sodium dodecyl sulfate, fatty acid salts, derivatives therefrom, and the like. Some more specific examples of classes of polyalkyleneoxide surfactants include polymethyleneoxide, poly(methyleneoxide-ethyleneoxide), polyethyleneoxide, polypropylenenoxide, and poly(ethyleneoxide-propyleneoxide) surfactants.

In another embodiment, the invention relates to a catalyst. The catalyst includes the platinum-coated particles as thus far described. In one embodiment, the platinum-coated particles in the catalyst are bound to a support. The support can be any suitable support. For example, the support can be carbon, alumina, silica, silica-alumina, titania, zirconia, calcium carbonate, barium sulphate, a zeolite, interstitial clay, and the like. In another embodiment, the platinum-coated particles in the catalyst are not bound to a support.

One class of catalysis reactions for which the platinum-coated particles are applicable includes hydrogenation and dehydrogenation reactions of hydrocarbons. Another class of applicable catalysis reactions includes carbon-carbon cross-coupling reactions. Yet another class of applicable catalysis reactions includes hydrosilylation reactions.

In another embodiment, the invention relates to an electrocatalyst. The electrocatalyst includes the platinum-coated particles described above bound to an electrically conductive support. In a preferred embodiment, the electrocatalyst is an oxygen-reducing electrocatalyst in an oxygen-reducing cathode.

Preferably, the electrically conductive support is carbon-based. Some examples of carbon-based electrically conductive supports include carbon black, graphitized carbon, graphite, and activated carbon. The electrically conductive support material is preferably finely divided.

In yet another embodiment, the invention relates to a fuel cell. The fuel cell includes an oxygen-reducing cathode having the platinum-coated particles described above bound to an electrically conductive support. The oxygen-reducing cathode is in electrical contact with an anode, i.e., a fuel-oxidizing anode. An ion-conducting electrolyte, more preferably a proton-conducting electrolyte or solid proton-conducting membrane, is in mutual contact with the oxygen-reducing cathode and anode.

The structure of a typical electrode in a fuel cell includes 1) a fluid permeable side with hydrophobic characteristics and 2) a catalytic side provided with a particulate electrocatalyst. The catalytic side is in direct contact with a liquid or solid electrolyte (e.g., the proton-conducting medium).

The hydrophobic characteristics on the electrode can be provided by one or more substances which are suitably hydrophobic, adhere to the electrode, and do not interfere with the electrochemical process. The hydrophobic substance can also be used as a binder for the supported or unsupported electrocatalyst.

A preferred class of suitable hydrophobic substances is the class of fluorinated polymers. Some examples of particularly preferred fluorinated polymers include polytetrafluoroethylene (PTFE), polytrifluorochloroethylene, and copolymers composed of tetrafluoroethylene and one or more other fluorinated or non-fluorinated monomers. The hydrophobic substance is typically included in an amount of 20 to about 40 percent by weight of the amount of electrocatalyst and/or support.

The electrodes can be any of various shapes, including tubular, rod-like, or planar. In order to maximize the area-to-volume ratio of the electrode, the electrodes are preferably in the form of thin sheets.

The ion-conducting medium conducts either protons or reduced oxygen species from one electrode to the other while separating the fuel at the anode from the oxidant at the cathode. Preferably, the ion-conducting medium or membrane is proton-conducting, i.e., selectively conducts protons from the anode to the cathode.

The proton-conducting medium or membrane can be in any of several suitable forms, for example, a liquid, solid, or semi-solid. A preferred class of proton-conducting polymer electrolytes are the commercially available copolymers of tetrafluoroethylene and perfluorinated vinyl ethers marketed by E. I. duPont de Nemours and Co under the trade name NAFION®. Such membrane-like materials are derivatized with acidic groups, such as sulfonic, carboxylic, phosphinic, or boric acid groups.

The anode of the fuel cell can be any of the anodes known in the art. For example, the anode can include supported or unsupported platinum or platinum-alloy compositions. The anode can also include a carbon monoxide-tolerant electrocatalyst. Such carbon monoxide tolerant anodes include numerous platinum alloys. A notable carbon monoxide-tolerant anode containing an atomically thin layer of platinum on ruthenium nanoparticles has been disclosed by Adzic et al. (U.S. Pat. No. 6,670,301 B2). The foregoing patent by Adzic et al. is included herein by reference in its entirety.

The anode of a fuel cell can also incorporate the platinum-coated particle composites of the invention. The platinum-coated particle composites can be incorporated in only the cathode, in only the anode, or in both the cathode and anode.

The fully assembled fuel cell can have stack designs to increase the electrical output. For example, any of the known stack configurations designed for compactness and efficient supply of fuels to the anode and oxygen to the cathode can be used.

In another embodiment, the invention relates to a method for reducing oxygen gas. In one embodiment, the method uses the platinum-coated particles described above on a suitable electrode to reduce oxygen gas. When reducing oxygen, the platinum-coated particles can be in the form of, for example, an unsupported powdery or granular solid, or alternatively, an unsupported dispersion or suspension in a liquid phase. The particle composites can be bound to a support when reducing oxygen gas.

In another embodiment, the invention relates to a method for producing electrical energy from the fuel cell described above. The fuel cell, as described, becomes operational and produces energy when the oxygen-reducing cathode is contacted with an oxidant, such as oxygen, and the fuel-oxidizing anode is contacted with a fuel source.

Oxygen gas can be supplied to the oxygen-reducing cathode in the form of pure oxygen gas. Pure oxygen gas is preferable for use in alkaline fuel cells. In the case of acid electrolyte fuel cells, the oxygen gas is more preferably supplied as air. Alternatively, oxygen gas can be supplied as a mixture of oxygen and one or more other inert gases. For example, oxygen can be supplied as oxygen-argon or oxygen-nitrogen mixtures.

Some contemplated fuel sources include, for example, hydrogen gas, alcohols, methane, gasoline, formic acid, dimethyl ether, and ethylene glycol. Some examples of suitable alcohols include methanol and ethanol. For alkaline fuel cells, the hydrogen gas is preferably very pure, and accordingly, free of contaminants such as carbon dioxide which degrade the strongly alkaline electrolyte.

The fuels can be unreformed, i.e., oxidized directly by the anode. Alternatively, the fuels can be used indirectly, i.e., treated by a reformation process to produce hydrogen. For example, hydrogen gas can be generated and supplied to the anode by reforming methanol, methane, or gasoline.

The platinum-coated particles can be produced by any suitable method. Some methods known in the art for synthesizing such particles include reductive chemical methods, chemical vapor deposition (CVD), thermal decomposition, physical vapor deposition (PVD), reactive sputtering, electrodeposition, laser pyrolysis, and sol gel techniques.

In solution, platinum can be deposited onto suspended metal substrate particles by a spontaneous redox replacement process. For example, a suitable platinum salt will spontaneously deposit platinum onto substrate particles coated with metals of lower reduction potential than platinum.

For example, in one embodiment, an atomically thin platinum layer is deposited onto palladium, palladium alloy, or other metal alloy substrate particles by redox displacement by platinum of a metal of lower reduction potential than platinum. See, for example, J. Zhang, et al., "Platinum Monolayer Electrocatalysts For $O_2$ Reduction: Pt Monolayer On Pd(111) And On Carbon-Supported Pd Nanoparticles", *J. Phys. Chem. B.*, 108: 10955 (2004). The latter reference is incorporated herein by reference in its entirety.

The method disclosed in Zhang et al. involves first, the electrodeposition of an atomic monolayer of metal of lower reduction potential than platinum (i.e., an underpotentially deposited metal), such as copper, onto palladium nanoparticles. The electrodeposition is followed by contact with a platinum salt to initiate a spontaneous redox displacement of a copper atomic monolayer by a platinum atomic monolayer. The atomic monolayer of copper can be displaced by platinum by, for example, immersing the copper-coated palladium nanoparticles into a solution containing a platinum salt, for example, $K_2PtCl_4$.

Other metals and mixtures of metals can be similarly co-deposited by contacting the copper-coated palladium nanoparticles with their corresponding salts. For example, monolayers of iridium, ruthenium, osmium, and rhenium can be deposited by displacement of a copper monolayer using $IrCl_3$, $RuCl_3$, $OsCl_3$, $ReCl_3$, respectively.

Platinum can also be deposited onto metal substrate particles by chemically reductive (i.e., electroless) means. For example, in solution, platinum can be deposited onto substrate particles in the presence of a reducing agent, such as, for example, $NaBH_4$, citric acid, hypophosphorous acid, or hydrazine.

Chemical reductive methods can also be used to synthesize the substrate particles onto which platinum is deposited. For example, chemical reductive methods can be used to make nanoparticles of palladium, gold, rhodium, iridium, ruthenium, osmium, rhenium, nickel, cobalt, iron, and combinations thereof.

Alternatively, a platinum-containing vapor or plasma is contacted with palladium, palladium alloy, or other metal alloy particles to deposit an atomically thin layer of platinum onto the substrate particles.

Vapor phase methods can also be used to make the substrate particles. For example, a vapor or plasma containing palladium can be allowed to condense to form nanoparticles of palladium. The nanoparticles of palladium can then be subsequently contacted with a platinum-containing vapor or plasma to deposit a layer of platinum onto the palladium nanoparticles.

The electrocatalyst can be incorporated into the oxygen-reducing cathode of a fuel cell by any method known in the art. For example, the electrocatalyst can be incorporated by coating an electrode with the electrocatalyst in a suitable binder and incorporating the coated electrode as an oxygen-reducing cathode in the fuel cell described above.

In a preferred embodiment, the electrocatalyst is incorporated into the oxygen-reducing cathode by mixing the electrocatalyst with an appropriate amount of Vulcan™ carbon and a fluorinated polymer, such as polytetrafluoroethylene. Any two of the foregoing ingredients can be pre-mixed before mixing with the third ingredient. The resulting mixture is preferably pressed onto a nickel net having a gold overlayer.

Examples have been set forth below for the purpose of illustration and to describe the best mode of the invention at the present time. However, the scope of this invention is not to be in any way limited by the examples set forth herein.

EXAMPLE 1

Preparation of Platinum-Coated Palladium Nanoparticle Composites

The platinum-coated palladium nanoparticle composites of the present invention were prepared by depositing atomically thin platinum layers on palladium nanoparticles by redox displacement by platinum of an adlayer of an underpotentially deposited (upd) metal on a palladium nanoparticle substrate. In this example, copper was used as the underpotentially deposited metal on a palladium nanoparticle substrate.

To prepare an electrode with Pd nanoparticles, a dispersion of palladium nanoparticles on carbon substrate (Pd/C) was made by sonicating the Pd/C nanoparticles in water for about 5-10 minutes to make a uniform suspension. The carbon substrate used was Vulcan XC-72. Then, 5 microliters of this suspension was placed on a glassy carbon disk (GC) electrode and dried in air.

The GC electrode holding the Pd/C nanoparticles was then placed in a 50 mM $CuSO_4$/0.10M $H_2SO_4$ solution to electrodeposit copper. After electrodeposition of copper monolayer, the electrode was rinsed to remove copper ions from the electrode. The electrode was then placed in an aqueous solution containing 1.0 mM $K_2PtCl_4$ in 50 mM $H_2SO_4$ in a nitrogen atmosphere. After a 1-2 minute immersion to completely replace copper by platinum, the electrode was rinsed again. The deposition of an atomic monolayer of platinum on palladium nanoparticles was verified by voltammetry and by Auger electron Spectroscopy (AES). The same process was done with a Pd(111) single crystal electrode and verified by scanning tunneling microscopy (STM) using a Molecular Imaging Pico STM with a 300S Pico Bipotentiostat. The cell was made of Teflon, and STM tips were prepared from 80:20 Pt/Ir wire, insulated with Apiezon.

All of these operations were carried out in a multi-compartment cell in a nitrogen atmosphere that prevents the oxidation of Cu adatoms in contact with $O_2$.

EXAMPLE 2

Electrocatalytic Activity Measurements of Platinum Monolayer-Coated Palladium Nanoparticles The oxygen reduction electrocatalytic activity of the platinum-coated palladium nanoparticle composites of the present invention (denoted as Pt/Pd) was compared to the electrocatalytic activity of palladium (Pd) and platinum (Pt) nanoparticle catalysts by measuring polarization curves using a rotating disk electrode operating at 1600 rpm (see FIG. 1). In the polarization curve of FIG. 1, Pd 10/C and Pd 20/C refer to palladium loading concentrations of 10 nmol and 20 nmol on carbon support, respectively. Pt 10/C refers to a platinum loading of 10 nmol. The Pd 10/C curve was measured on palladium nanoparticles of 9 nm size; the Pt 10/C curve was measured on platinum nanoparticles of 3.1 nm size; the Pt/Pd 10/C and 20/C curves were measured on nanoparticle composites of 9 nm size.

As shown by the polarization curves in FIG. 1, the activity of Pt/Pd 10/C is much higher than that of Pd 10/C as indicated by a positive shift of the half-wave potential of 120 mV. For Pt/Pd 10/C, the actual Pt loading is about 1.5 nmol as compared to 10 nmol in Pt 10/C. Yet, significantly, and unexpectedly, the activity of Pt/Pd 10/C is about 25 mV higher in half-wave potential than that of Pt 10/C. The Pt/Pd 20/C nanoparticles had the highest activity, mainly due to the increased platinum surface area. The higher activity of the platinum-coated palladium nanoparticles of the present invention as compared with those of Pt and Pd nanoparticles indicate a synergistic effect between Pd and Pt in the platinum-coated palladium nanoparticles. The synergistic effect found in the nanoparticles of the present invention allows significantly smaller loading of platinum (at least seven times lower) along with significantly increased electrocatalytic activity.

Figure 2:
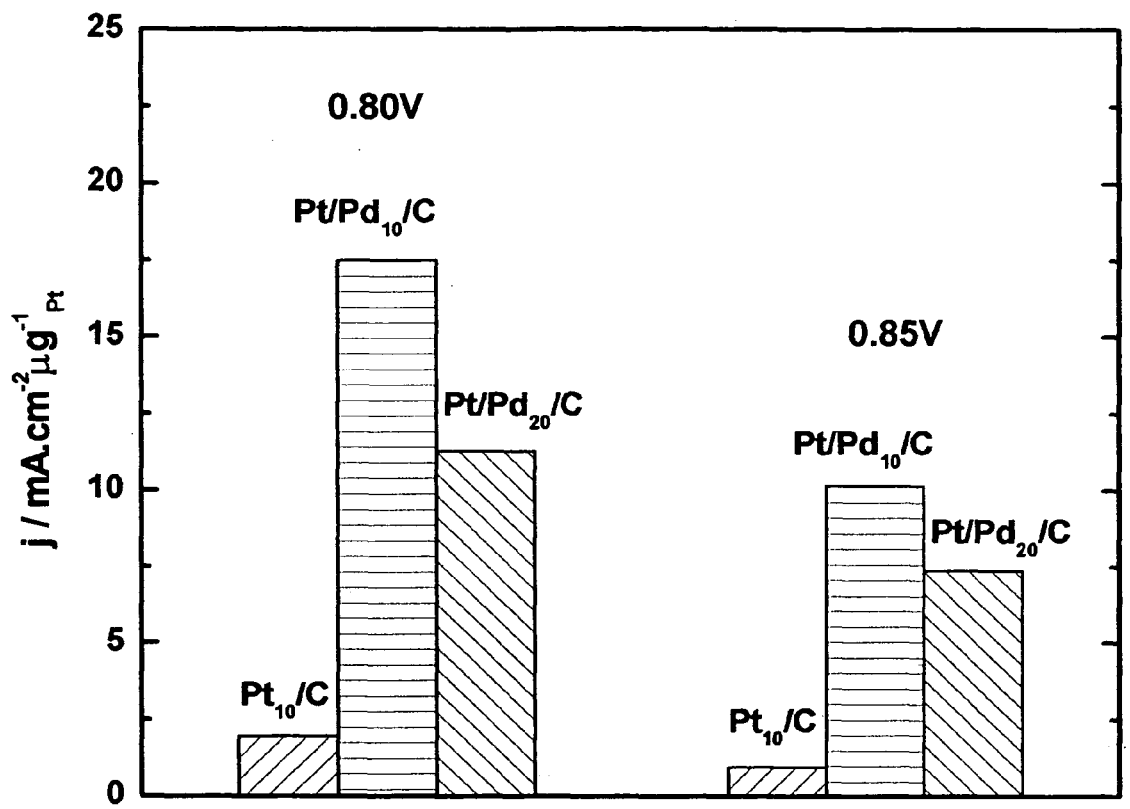
FIG. 2. Comparison of Pt mass-specific activities of platinum nanoparticles (10 nmol Pt loading) and platinum-coated palladium nanoparticles of the present invention (1.3 and 2.4 nmol Pt loading, left and right sets of bars, respectively) on palladium nanoparticles (10 and 20 nmol Pd loadings).

In addition to the polarization curves, a useful way of comparing the activities of various electrocatalysts is by comparing their mass-specific activities. FIG. 2 compares the Pt mass-specific activities of platinum nanoparticles of 10 nmol Pt loading, i.e., $Pt_{10}/C$, and palladium nanoparticles coated with a monolayer of platinum atoms ($Pt/Pd_{10}/C$ and $Pt/Pd_{10}/C$). The left set of bars correspond to 1.3 nmol Pt loading. The right set of bars correspond to 2.4 nmol Pt loading. FIG. 2 shows that the platinum monolayer-coated palladium nanoparticles of the present invention have five to eight times greater activity than the platinum nanoparticles.

Figure 5:
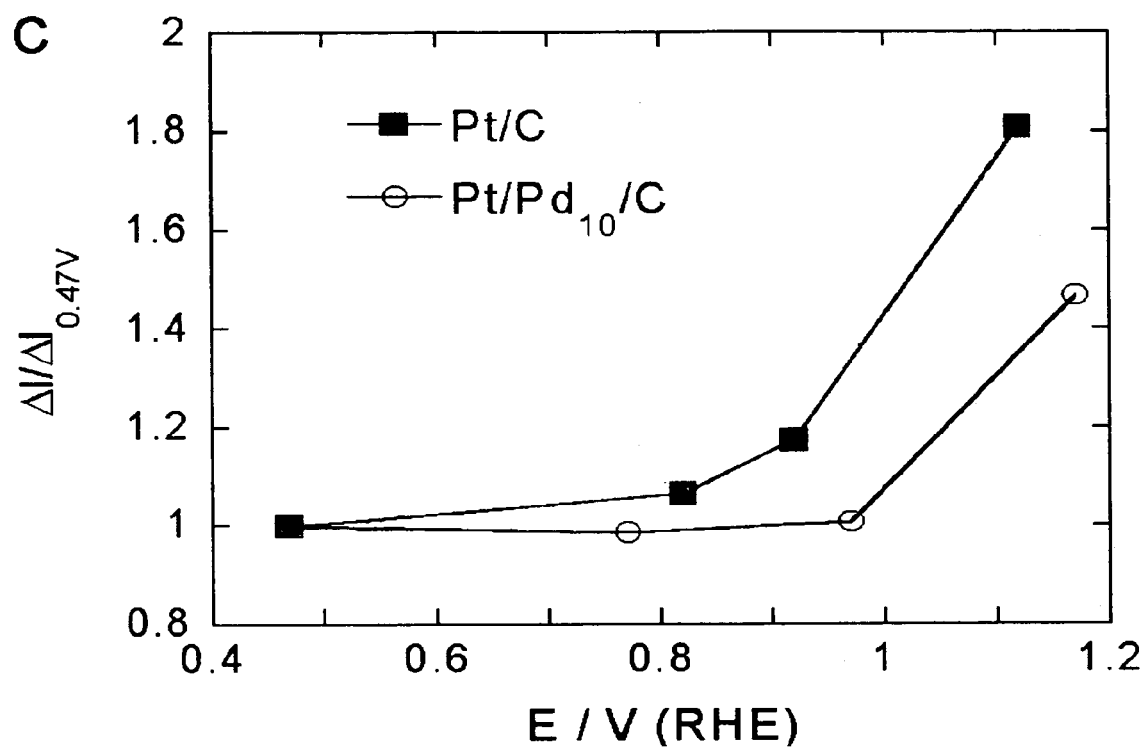
FIG. 5. X-ray spectroscopy absorption peak of Pt—OH formation as a function of potential for Pt monolayer on palladium nanoparticles and Pt monolayer on carbon.

It has also been found that the degree of platinum oxidation in the form of Pt—OH formation is significantly reduced in platinum monolayers on palladium nanoparticles as compared to platinum on carbon (see FIG. 5). In FIG. 5, the change in the XANES X-ray absorption peak for Pt—OH formation was plotted at four different potentials in 1M $HClO_4$ for Pt monolayer on palladium nanoparticles and Pt monolayer on carbon. The change in absorption from upper absorption baseline to absorption peak at a particular voltage is designated $\Delta I$. The change in absorption from upper absorption baseline to absorption peak at 0.47V is designated $\Delta I_{0.47V}$. The ratio $\Delta I/\Delta I_{0.47V}$ corresponds to the tendency of the platinum coat to oxidize at potentials greater than 0.47V. The plot of $\Delta I/\Delta I_{0.47V}$ against potential shows that the tendency for Pt monolayer-coated palladium nanoparticles to oxidize at higher potentials than 0.47V is significantly less than the tendency of platinum on carbon to oxidize at such potentials.

EXAMPLE 3

Figure 3:
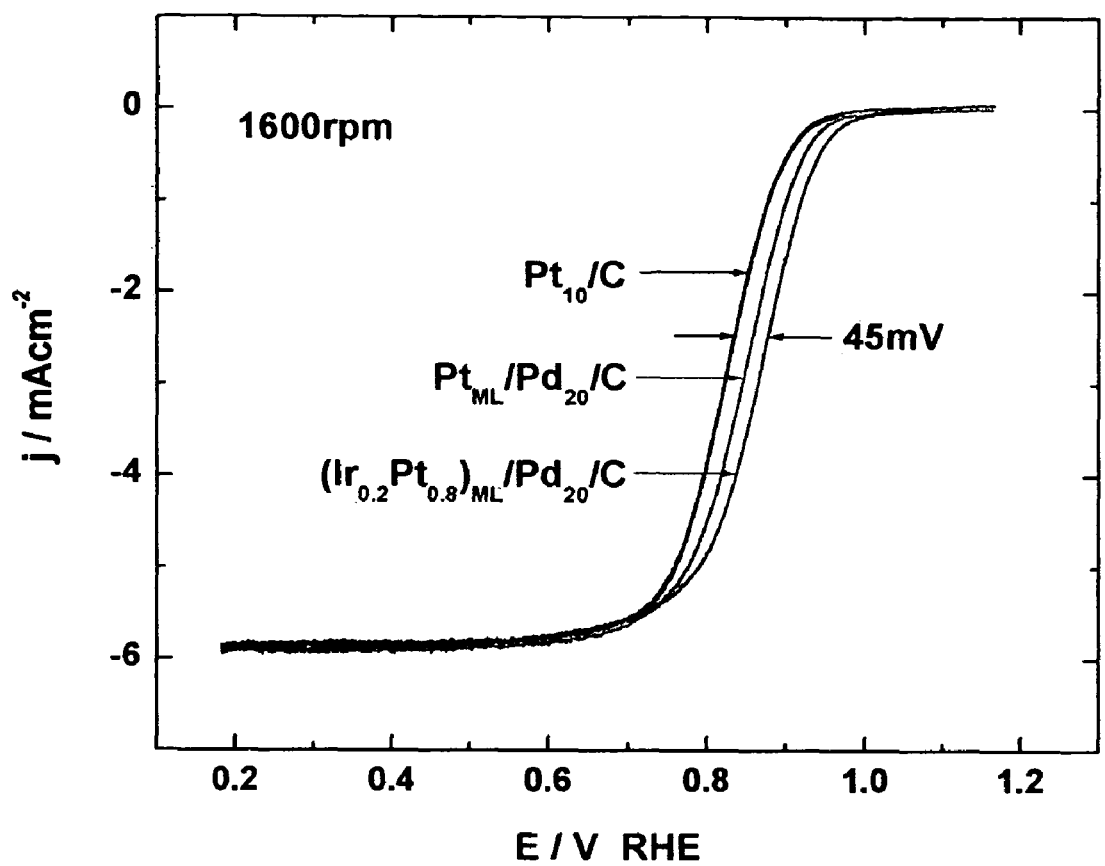
FIG. 3. Comparison of polarization curves for oxygen reduction on commercial platinum nanoparticles, 10 nmol loading (left curve); platinum-coated palladium nanoparticles of the present invention, 20 nmol Pd loading (middle curve), and $Ir_{0.2}Pt_{0.8}$-coated palladium nanoparticles of the present invention (right curve).

Electrocatalytic Activity Measurements of Platinum-Iridium and Platinum-Ruthenium Alloy Monolayers on Palladium Nanoparticles The oxygen reduction electrocatalytic activity of monolayers of platinum-iridium alloy on palladium nanoparticles having 20 nmol Pd loading, i.e., $(Ir_{0.2}Pt_{0.8})_{ML}/Pd_{20}/C$, was compared to the electrocatalytic activity of monolayers of platinum on palladium nanoparticles having 20 nmol Pd loading, i.e., $Pt_{ML}/Pd_{20}/C$, and to commercial platinum nanoparticle catalysts having 10 nmol Pt loading, i.e., $Pt_{10}/C$, by measuring polarizations using a rotating disk electrode operating at 1600 rpm (see FIG. 3). In the polarization curve of FIG. 3, $(Ir_{0.2}Pt_{0.8})_{ML}/Pd_{20}/C$ has a half-wave potential 45 mV higher than commercial $Pt_{10}/C$, which corresponds to a significantly higher activity than commercial $Pt_{10}/C$. In addition, $(Ir_{0.2}Pt_{0.8})_{ML}/Pd_{20}/C$ is shown to have a higher activity than $Pt_{ML}/Pd_{20}/C$, as evidenced in its higher polarization of 20 mV as compared to $Pt_{ML}/Pd_{20}/C$. The increased activity is believed to be a consequence of a decrease in OH adsorption imparted by the Ir alloying component.

Figure 4:
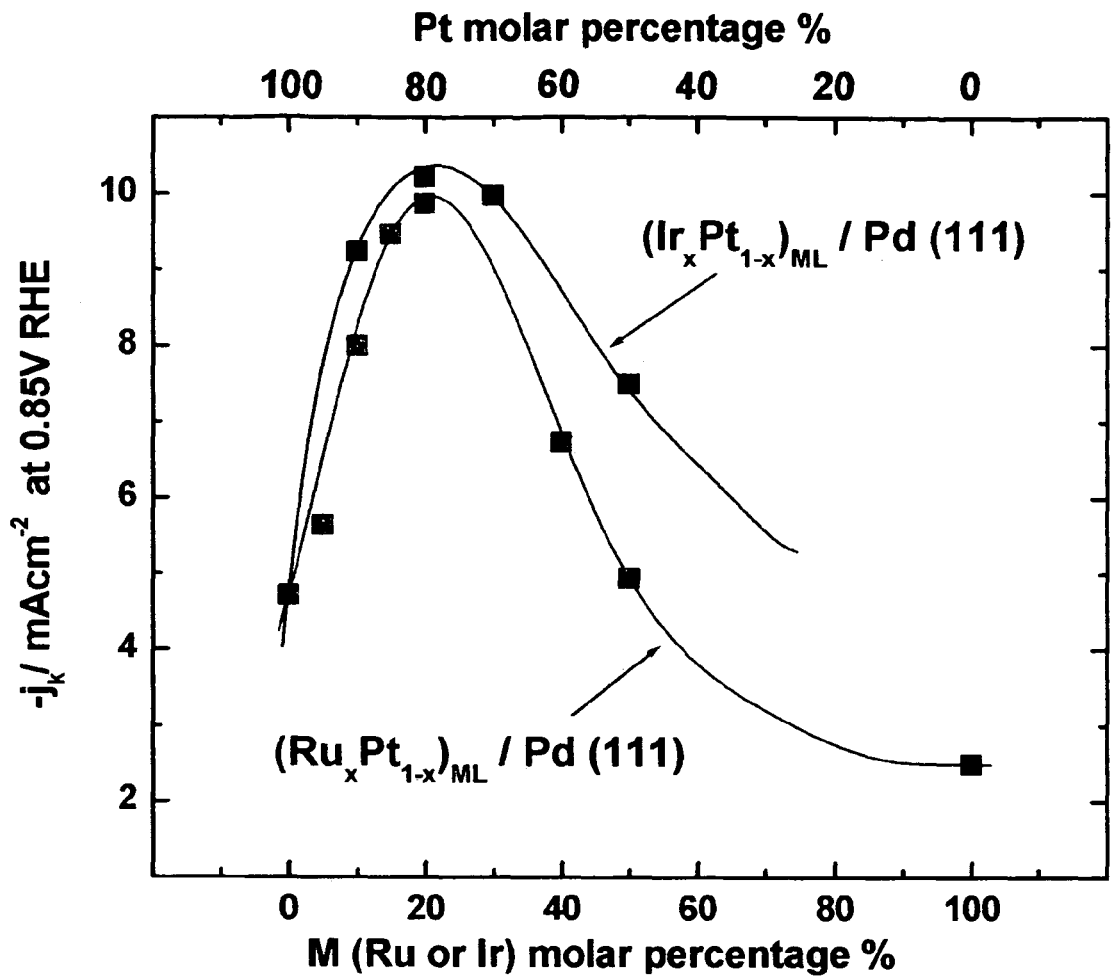
FIG. 4. Comparison of the activities of $Ir_xPt_{1-x}$-coated and $Ru_xPt_{1-x}$-coated palladium nanoparticles of the present invention as a function of molar ratio x at 0.8V.

In addition, the activities of monolayers of two platinum alloy series $Ir_xPt_{1-x}$ and $Ru_xPt_{1-x}$ on a Pd(111) electrode were tested by measuring currents at 0.8V while varying the molar ratio x from approximately 0 to approximately 100 (see FIG. 4). As shown by FIG. 4, the maximum activity is observed when x is approximately 0.1 to 0.3. The highest activity is observed when x is approximately 2, which corresponds to alloy formulations of $Ir_{0.2}Pt_{0.8}$ and $Ru_{0.2}Pt_{0.8}$.

EXAMPLE 4

Synthesis of Platinum-Coated Gold-Nickel Nanoparticles

A nickel core encapsulated by an atomically thin layer of gold was prepared by treating an aqueous suspension containing one equivalent of gold chloride ($AuCl_3$), ten equivalents of nickel chloride ($NiCl_2$), and carbon powder, with sodium borohydride at room temperature. The water of the resulting suspension of reduced metal was removed, and the resulting powder dried under an inert atmosphere. In order to ensure gold segregation onto the nickel surface, the dried powder was then annealed under a pure hydrogen gas environment at 600° C. for one hour.

A platinum monolayer was deposited onto the gold-nickel -particles according to the redox displacement method described in Example 1 for the platinum-coated palladium nanoparticle composites.

EXAMPLE 5

Figure 6:
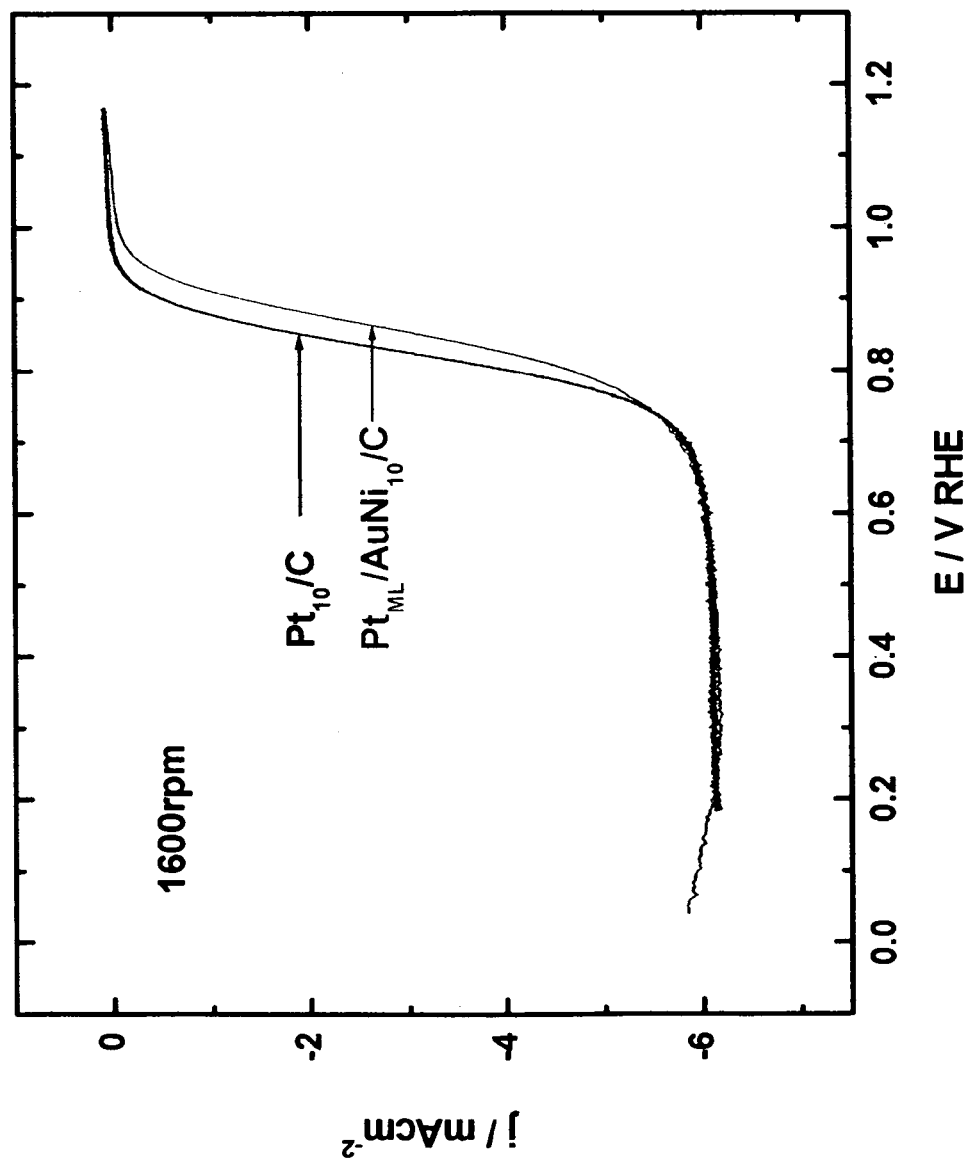
FIG. 6. Comparison of polarization curves for oxygen reduction on commercial platinum nanoparticles of 10 nmol Pt loading ($Pt_{10}/C$, left curve); and platinum-coated gold-nickel alloy nanoparticles of the present invention ($Pt_{ML}/AuNi_{10}/C$, right curve, where ML=monolayer).

Electrocatalytic Activity Measurements of Platinum-Coated Gold-Nickel Nanoparticles FIG. 6 graphs electrocatalytic oxygen reduction of Pt/AuNi/C and commercial platinum nanoparticle catalysts. The activity of the platinum monolayer on AuNi nanoparticles is higher (27 mV in half-wave potential) than that of platinum nanoparticles (61 nmol/$cm^2$). For the AuNi loading of 4.0 $\mu g_{Au}/cm^2$, the amount of platinum in the monolayer on this surface is 5.3 nmol/cm$^2$ (1.03 µg$_{Pt}$/cm$^2$). The half-wave potential for this electrode is 0.850 V. Notably, the activity of this surface is higher than that of 61 nmol/cm$^2$ (12 µg$_{Pt}$/cm$^2$) of platinum nanoparticles.

Figure 7:
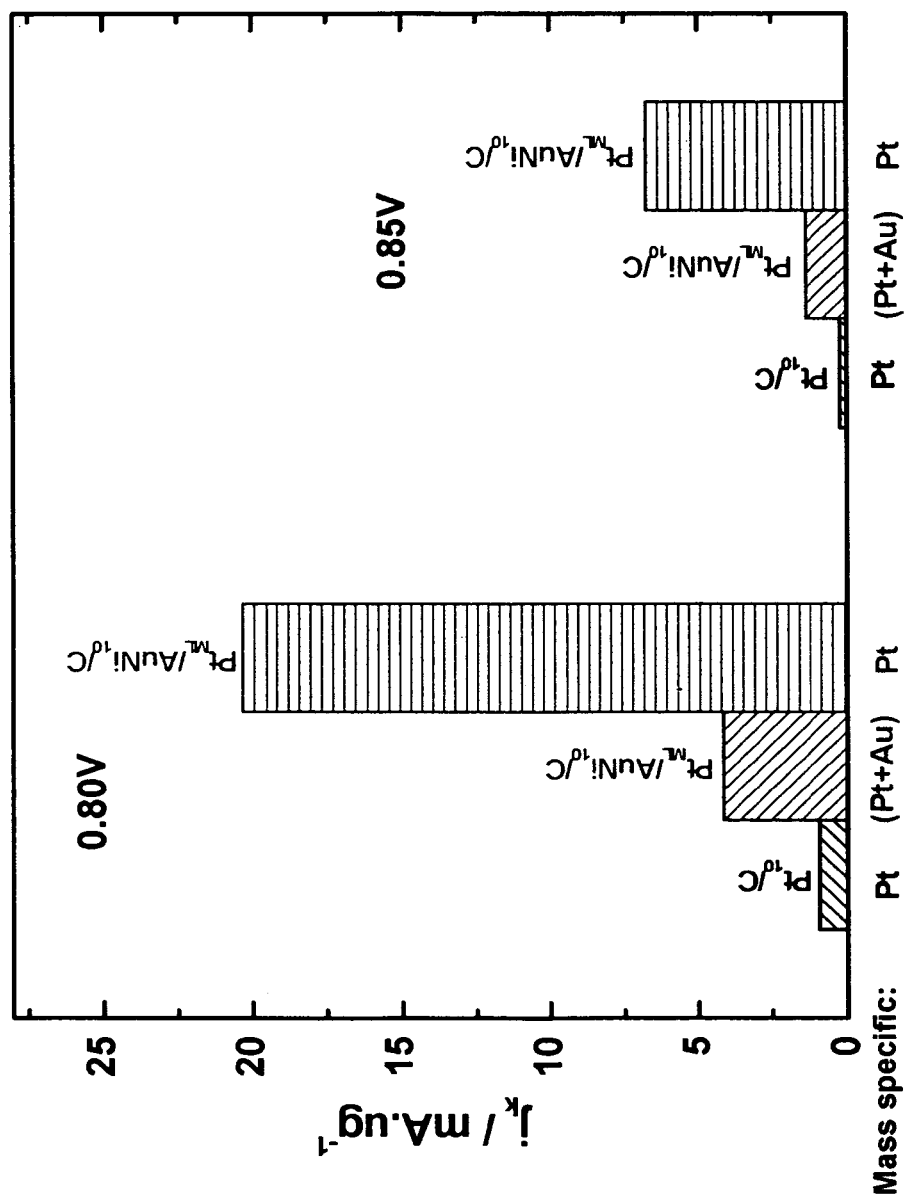
FIG. 7. Comparison of Pt and (Pt+Au) mass-specific activities of platinum nanoparticles of 10 nmol Pt loading ($Pt_{10}/C$) and platinum-coated gold-nickel alloy nanoparticles of the present invention ($Pt_{ML}/AuNi_{10}/C$) expressed as the current at 0.80 V and 0.85 V.

A comparison of the mass-specific activities of Pt/Au/Ni/C and Pt$_{10}$/C electrocatalysts is displayed in FIG. 7 expressed as the kinetic current at 0.85 V and 0.80 V divided by the platinum mass. The electrode having platinum monolayer particles (Pt/Au/Ni/C) has twenty times higher activity than the electrode with platinum nanoparticles. When the activity is calculated for the total noble metal content, Pt+Au, the activity is 4.16 mA/µg$_{(Pt+Au)}$, or 4 times that of Pt/C, which is a significantly higher activity.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A particle composite comprising:
a core at least partially encapsulated by a shell to form a core-shell particle in which the core and shell have different compositions, being comprised of elements selected from the first, second, and third rows of transition metals; and
an atomically thin layer of platinum atoms at least partially encapsulating the core-shell particle;
wherein at least a portion of the platinum atoms is zerovalent.

2. The particle composite of claim 1, wherein:
the atomically thin layer of platinum atoms comprises a thickness of about a sub-monolayer to about three monolayers.

3. The particle composite of claim 1, wherein the core comprises elemental palladium.

4. The particle composite of claim 1, wherein the core is at least partially encapsulated by a palladium shell.

5. The particle composite of claim 1, wherein:
the core comprises an element selected from the group containing ruthenium, rhodium, rhenium, osmium, and iridium.

6. The particle composite of claim 1, wherein:
the core comprises an alloy comprising at least one element chosen from the second or third row of transition metals.

7. The particle composite of claim 6, wherein:
the alloy further comprises an alloying metal chosen from the first row of transition metals.

8. The particle composite of claim 7, wherein:
the alloying metal is one of iron, cobalt, nickel, and combinations thereof.

9. The particle composite of claim 1, wherein the shell is atomically thin.

10. The particle composite of claim 1, wherein:
the core comprises one of iron, cobalt, nickel, and combinations thereof.

11. The particle composite of claim 10, wherein:
the shell comprises a metal chosen from the group consisting of ruthenium, rhodium, palladium, rhenium, osmium, iridium, gold, and combinations thereof.

12. The particle composite of claim 11, wherein the shell comprises gold-rhenium.

13. The particle composite of claim 1, wherein:
the platinum is less than one monolayer thick.

14. The particle composite of claim 13, further comprising:
a second metal of thickness less than one monolayer, the second metal and the platinum combining to form a platinum alloy of about one monolayer on the core-shell particle.

15. The particle composite of claim 14, wherein the platinum and the second metal are co-deposited on the surface of the core-shell particle.

16. The particle composite of claim 14, wherein:
the second metal is chosen from the group consisting of ruthenium, rhenium, osmium, iridium, and gold; and
the second metal comprises about twenty percent of the platinum alloy while the platinum comprises about eighty percent of the platinum alloy.

17. The particle composite of claim 1, further comprising:
metal-bonding ligands or surfactants on the atomically thin layer of platinum.

18. The, particle composite of claim 1, wherein:
the particle composite has a size of approximately 3 nanometers to approximately 100 nanometers.

19. The particle composite of claim 18, wherein:
the particle composite has a size of approximately 3 nanometers to approximately 10nanometers.

20. The particle composite of claim 19, wherein:
the particle composite has a size of approximately 5 nanometers.

* * * * *